(12) United States Patent
Kim et al.

(10) Patent No.: US 12,518,678 B2
(45) Date of Patent: Jan. 6, 2026

(54) GATE DRIVER AND DISPLAY DEVICE INCLUDING THE SAME

(71) Applicant: Samsung Display Co., LTD., Yongin-si (KR)

(72) Inventors: Kyungho Kim, Yongin-si (KR); Nahyeon Cha, Yongin-si (KR); Sungyoon Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/655,482

(22) Filed: May 6, 2024

(65) Prior Publication Data

US 2025/0061841 A1     Feb. 20, 2025

(30) Foreign Application Priority Data

Aug. 14, 2023  (KR) .......... 10-2023-0106112

(51) Int. Cl.
 *G09G 3/32*     (2016.01)

(52) U.S. Cl.
 CPC ....... *G09G 3/32* (2013.01); *G09G 2300/0819* (2013.01); *G09G 2300/0852* (2013.01); *G09G 2310/0267* (2013.01); *G09G 2310/04* (2013.01); *G09G 2330/021* (2013.01); *G09G 2330/028* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 11,423,843 B2 | 8/2022 | Kim et al. | |
| 2017/0186363 A1* | 6/2017 | Park | G09G 3/3266 |
| 2022/0157250 A1* | 5/2022 | Kim | G09G 3/3225 |
| 2022/0165218 A1* | 5/2022 | Cho | G09G 3/3275 |
| 2024/0169896 A1* | 5/2024 | Ban | G09G 3/20 |

FOREIGN PATENT DOCUMENTS

KR   20220000022 A    1/2022

\* cited by examiner

*Primary Examiner* — Benjamin C Lee
*Assistant Examiner* — Nathan P Brittingham
(74) *Attorney, Agent, or Firm* — CANTOR COLBURN LLP

(57) ABSTRACT

A gate driver includes a control circuit which controls a voltage of a first control node and a voltage of a second control node in response to an input signal, a first control clock signal, a the second control clock signal, a carry output circuit which generates a carry signal in response to voltages of the first control node and the second control node, an enable node control circuit controlling a voltage of an enable node in response to the carry signal, an enable signal, and an inverted enable signal, a masking circuit which controls a voltage of a first intermediate node in response to the voltage of the first control node, the carry signal, and the voltage of the enable node, and a gate output circuit which outputs a gate signal in response to the carry signal, the voltage of the first intermediate node, and an output clock signal.

20 Claims, 23 Drawing Sheets

GATE DRIVER AND DISPLAY DEVICE INCLUDING THE SAME

This application claims priority to Korean Patent Application No. 10-2023-0106112, filed on Aug. 14, 2023, and all the benefits accruing therefrom under 35 U.S.C. § 119, the content of which in its entirety is herein incorporated by reference.

BACKGROUND

1. Field

Embodiments of the invention relate to a gate driver and a display device including the gate driver. More particularly, embodiments of the invention relate to a gate driver and a display device including the gate driver for performing a multi-frequency driving (MFD).

2. Description of the Related Art

Generally, a display device includes a display panel and a display panel driver. The display panel may include gate lines, data lines, emission lines, and pixels. The display panel driver may include a gate driver which provides a gate signal to the gate lines, a data driver which provides a data voltage to the data lines, an emission driver which provides an emission signal to the emission lines, and a driving controller which controls the gate driver, the data driver, and the emission driver.

When an image displayed on the display panel is a still image or the display panel operates in an always-on mode, a driving frequency of the display panel may be lowered to reduce a power consumption.

When some of the image displayed on the display panel is the still image and others of the image displayed on the display panel is a moving image, a driving frequency of some of the display panel where the still image is displayed may be lowered to further reduce the power consumption.

SUMMARY

Embodiments of the invention provide a gate driver for providing gate signals at different driving frequencies to each region of a display panel.

Embodiments of the invention provide a display device including the gate driver.

In an embodiment of a gate driver according to the invention, the gate driver includes a control circuit which controls a voltage of a first control node and a voltage of a second control node in response to an input signal, a first control clock signal, and a second control clock signal, a carry output circuit which generates a carry signal in response to the voltage of the first control node and the voltage of the second control node, an enable node control circuit which controls a voltage of an enable node in response to the carry signal, an enable signal, and an inverted enable signal, a masking circuit which controls a voltage of a first intermediate node in response to the voltage of the first control node, the carry signal, and the voltage of the enable node, and a gate output circuit which outputs a gate signal in response to the carry signal, the voltage of the first intermediate node, and an output clock signal.

In an embodiment, when the voltage of the first control node has a first level, the carry signal may have a second level, and when the voltage of the first control node has the second level, the carry signal may have the first level.

In an embodiment, in a period during which the carry signal has a first level, the output clock signal may have at least two active pulses having the first level.

In an embodiment, in a period during which the carry signal has a first level, the output clock signal may have one active pulse having the first level.

In an embodiment, when the enable signal has a first level before the carry signal having the first level is output, the enable node control circuit may control a voltage of the enable node to a second level, while the carry signal having the first level is output, the masking circuit may control the voltage of the first intermediate node to the second level in response to the voltage of the enable node having the second level, and while the carry signal having the first level is output, the gate output circuit may output the gate signal having the first level in response to the voltage of the first intermediate node having the second level.

In an embodiment, when the enable signal changes from the first level to the second level while the carry signal having the first level is output, the enable node control circuit may maintain the voltage of the enable node at the second level until an output of the carry signal having the first level is completed.

In an embodiment, when the enable signal has a second level before the carry signal having a first level is output, the enable node control circuit control a voltage of the enable node to the first level, while the carry signal having the first level is output, the masking circuit may control a voltage of the first intermediate node to the first level in response to the voltage of the enable node having the first level, and while the carry signal having the first level is output, the gate output circuit may not output the gate signal having the first level in response to a voltage of the first intermediate node having the first level.

In an embodiment, when the enable signal changes from the second level to the first level while the carry signal having the first level is output, the enable node control circuit may maintain a voltage of the enable node at the first level until an output of the carry signal having the first level is completed.

In an embodiment, while the carry signal having a first level is output, the enable node control circuit may maintain a voltage of the enable node at a previous level.

In an embodiment, the enable node control circuit may control a voltage of the enable node to the second level when the carry signal having a first level is not output, the enable signal has the first level, and the inverted enable signal has a second level, the voltage of the enable node has the second level, and the enable node control circuit may be which control the voltage of the enable node to the first level when the carry signal having the first level is not output, the enable signal has the second level, and the inverted enable signal has the first level.

In an embodiment, the enable node control circuit may include a first switching element including a gate electrode which receives the carry signal, a first electrode which receives a high gate voltage, and a second electrode connected to a second intermediate node, a second switching element including a gate electrode which receives the enable signal, a first electrode connected to the second intermediate node, and a second electrode connected to the enable node, a third switching element including a gate electrode which receives the inverted enable signal, a first electrode connected to a third intermediate node, and a second electrode connected to the enable node, and a fourth switching element including a gate electrode which receives the carry signal, a first electrode which receives a low gate voltage, and a second electrode connected to the third intermediate node.

In an embodiment, the enable node control circuit may further include a first capacitor including a first electrode connected to the enable node and a second electrode which receives the low gate voltage.

In an embodiment, the masking circuit may include a fifth switching element including a gate electrode connected to the enable node, a first electrode connected to the first control node, and a second electrode connected to a first intermediate node, and a sixth switching element including a gate electrode which receives the carry signal, a first electrode which receives the high gate voltage, and a second electrode connected to the first intermediate node.

In an embodiment, the masking circuit may further include a second capacitor including a first electrode which receives the output clock signal and a second electrode connected to the first intermediate node.

In an embodiment, the gate output circuit may include a seventh switching element including a gate electrode connected to the first intermediate node, a first electrode which receives the output clock signal, and a second electrode connected to a gate output node, and an eighth switching element including a gate electrode which receives the carry signal, a first electrode which receives a low gate voltage, and a second electrode connected to the gate output node.

In an embodiment, the gate driver may further comprise a second enable node control circuit which controls a voltage of a second enable node in response to the carry signal, a second enable signal, and a second inverted enable signal, a second masking circuit which controls a voltage of a fourth intermediate node in response to the voltage of the first control node, the carry signal, and the voltage of the second enable node, and a second gate output circuit which outputs a second gate signal in response to the carry signal, the voltage of the fourth intermediate node, and a second output clock signal.

In an embodiment, when the carry signal has a first level, the output clock signal may have at least two active pulses having the first level, and the second output clock signal may have one active pulse having the first level.

In an embodiment of a display device according to the invention, the display device may comprise a display panel including pixels and a gate driver which outputs a gate signal to the display panel. The gate driver includes a control circuit which controls a voltage of a first control node and a voltage of a second control node in response to an input signal, a first control clock signal, and a second control clock signal, a carry output circuit which generates a carry signal in response to the voltage of the first control node and the voltage of the second control node, an enable node control circuit which controls a voltage of an enable node in response to the carry signal, an enable signal, and an inverted enable signal, a masking circuit which controls a voltage of a first intermediate node in response to the voltage of the first control node, the carry signal, and the voltage of the enable node, and a gate output circuit which outputs the gate signal in response to the carry signal, the voltage of the first intermediate node, and an output clock signal.

In an embodiment, when the voltage of the first control node has a first level, the carry signal may have a second level, and when the voltage of the first control node has the second level, the carry signal may have the first level.

In an embodiment, in a period during which the carry signal has a first level, the output clock signal may have at least two active pulses having the first level.

According to the gate driver and the display device including the gate driver according to the embodiments, the gate driver may include the control circuit which controls the voltage of the first control node and the voltage of the second control node in response to the input signal, the first control clock signal, and the second control clock signal, the carry output circuit which generates the carry signal in response to the voltage of the first control node and the voltage of the second control node, the enable node control circuit which controls the voltage of the enable node in response to the carry signal, the enable signal, and the inverted enable signal, the masking circuit which controls the voltage of the first intermediate node in response to the voltage of the first control node, the carry signal, and the voltage of the enable node, and the gate output circuit which outputs the gate signal in response to the carry signal, the voltage of the first intermediate node, and the output clock signal. Accordingly, when the output clock signal has at least two active pulses in an active period, the gate signal corresponding to the number of output clock signal may be output.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
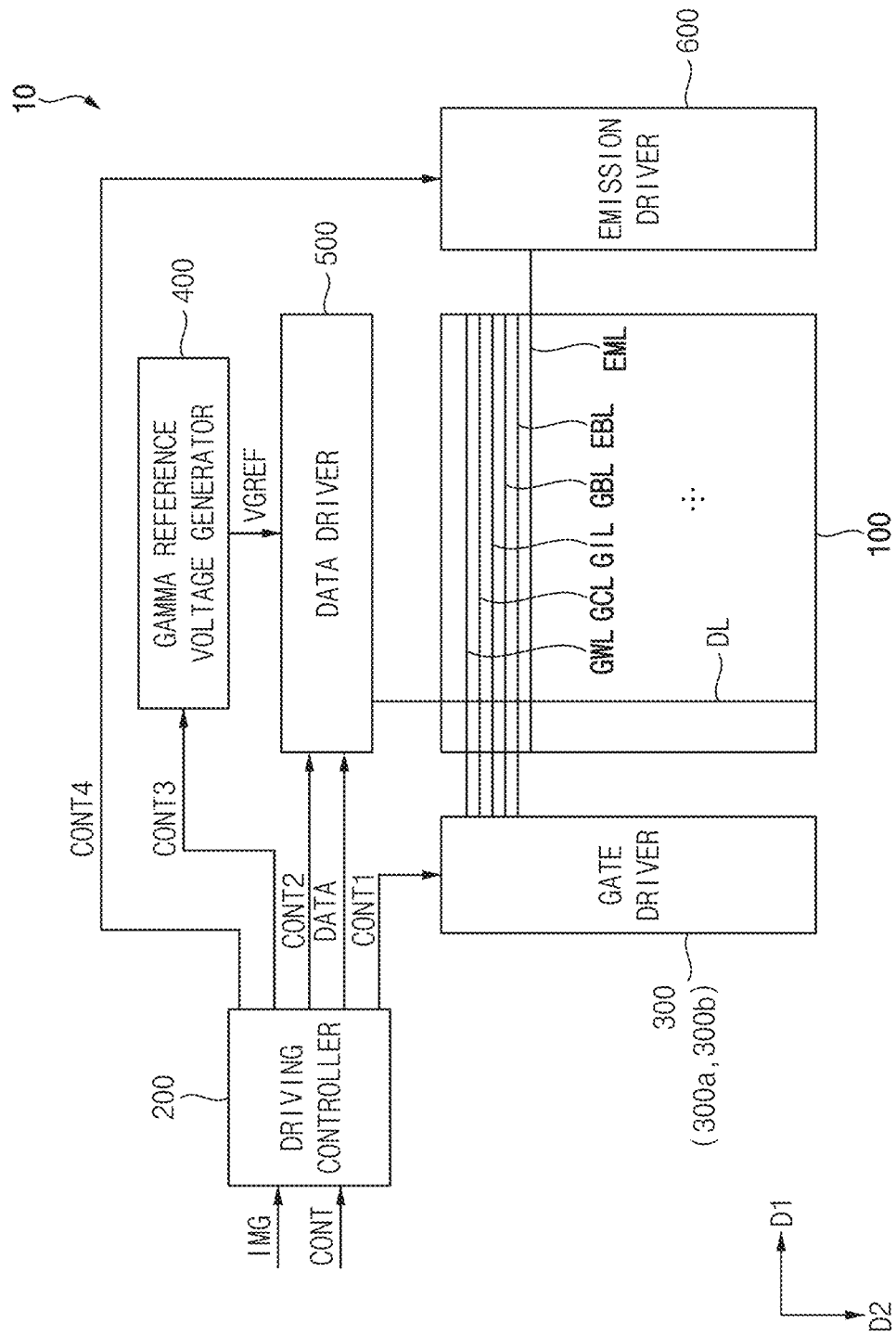
FIG. 1 is a block diagram illustrating a display device according to embodiments of invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display device according to embodiments of invention.

Referring to FIG. 1, an embodiment of a display device 10 may include a display panel 100 and a display panel driver. The display panel driver may include a driving controller 200, a gate driver 300, a gamma reference voltage generator 400, a data driver 500, and an emission driver 600.

The display panel 100 may include a display region for displaying an image and a peripheral region disposed adjacent to the display region.

The display panel 100 may include gate lines GWL, GCL, GIL, GBL, EBL, data lines DL, emission lines EML, and pixels electrically connected to the gate lines GWL, GCL, GIL, GBL, EBL, the data lines DL, and the emission lines EML. The gate lines GWL, GCL, GIL, GBL, EBL may extend in a first direction D1, the data lines DL may extend in a second direction D2 crossing the first direction D1, and the emission lines EML may extend in the first direction D1.

The driving controller 200 may receive input image data IMG and an input control signal CONT from an external device (not shown). In an embodiment, for example, the input image data IMG may include red image data, green image data, and blue image data. The input image data IMG may further include white image data. In another embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GWL, GCL, GIL, GBL, EBL in response to the first control signal CONT1 received from the driving controller 200. The gate driver 300 may output the gate signals to the gate lines GWL, GCL, GIL, GBL, EBL.

The gamma reference voltage generator 400 may generate a gamma reference voltage VGREF in response to the third control signal CONT3 received from the driving controller 200. The gamma reference voltage generator 400 may output the gamma reference voltage VGREF to the data driver 500. The gamma reference voltage VGREF may have a value corresponding to each data signal DATA.

In an embodiment, the gamma reference voltage generator 400 may be disposed in the driving controller 200 or the data driver 500.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage in analog form. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In FIG. 1, for a convenience of illustration and description, an embodiment where the gate driver 300 is disposed on a first side of the display panel 100 and the emission driver 600 is disposed on a second side of the display panel 100 is shown. However, the invention is not limited thereto. In an embodiment, for example, both the gate driver 300 and the emission driver 600 may be disposed on the first side of the display panel 100. In an embodiment, for example, both the gate driver 300 and the emission driver 600 may be disposed on both of opposing sides of the display panel 100. In an embodiment, for example, the gate driver 300 and the emission driver 600 may be formed integrally as a single unit (e.g., a single chip).

Figure 2:
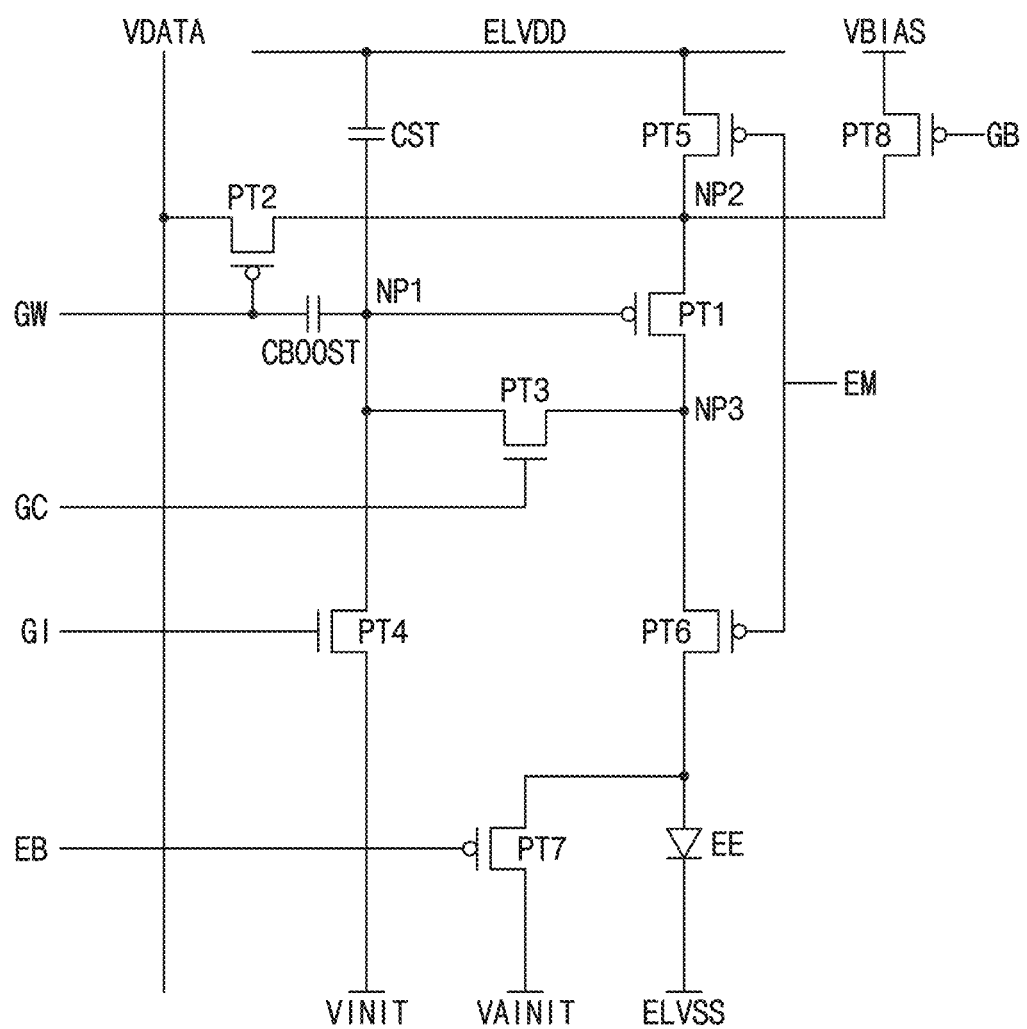
FIG. 2 is a circuit diagram illustrating an embodiment of a pixel of a display panel of FIG. 1.

FIG. 2 is a circuit diagram illustrating an embodiment of a pixel of a display panel of FIG. 1.

Referring to FIG. 2, in an embodiment, the pixels may receive a data write gate signal GW, a compensation gate signal GC, a data initialization gate signal GI, a light emitting element initialization gate signal EB, a bias gate signal GB, the data voltage VDATA, and the emission signal EM, and emit a light depending on a level of the data voltage VDATA to display the image.

In an embodiment, the pixels may include a switching element of a first type and a switching element of a second type which is different from the first type. In an embodiment, for example, the switching element of the first type may be a polysilicon thin film transistor. In an embodiment, for example, the switching element of the first type may be a low temperature polysilicon (LTPS) thin film transistor. In an embodiment, for example, the switching element of the second type may be an oxide thin film transistor. In an embodiment, for example, the switching element of the first type may be a P-type transistor, and the switching element of the second type may be an N-type transistor.

In an embodiment, as shown in FIG. 2, a pixel of the pixels may include first to eighth pixel switching elements PT1 to PT8 and a light emitting element EE.

In an embodiment, the pixel may include the first pixel switching element PT1 including a gate electrode connected to a first pixel node NP1, a first electrode connected to a second pixel node NP2, and a second electrode connected to a third pixel node NP3, the second pixel switching element PT2 including a gate electrode that receives the data write gate signal GW, a first electrode that receives the data voltage VDATA, and a second electrode connected to the second pixel node NP2, the third pixel switching element PT3 including a gate electrode that receives the compensation gate signal GC, a first electrode connected to the first pixel node NP1, and a second electrode connected to the third pixel node NP3, the fourth pixel switching element PT4 including a gate electrode that receives the data initialization gate signal GI, a first electrode that receives an initialization voltage VINIT, and a second electrode connected to the first pixel node NP1, the fifth pixel switching element PT5 including a gate electrode that receives the emission signal EM, a first electrode that receives a pixel high power supply voltage ELVDD, and a second electrode connected to the second pixel node NP2, the sixth pixel switching element PT6 including a gate electrode that receives the emission signal EM, a first electrode connected to the third pixel node NP3, a second electrode connected to an anode of the light emitting element EE, the seventh pixel switching element PT7 including a gate electrode that receives the light emitting element initialization gate signal EB, a first electrode that receives a light emitting element initialization voltage VAINIT, and a second electrode connected to the anode of the light emitting element EE, an eighth pixel switching element PT8 including a gate electrode that receives the bias gate signal GB, a first electrode that receives a bias voltage VBIAS, a second electrode connected to the second pixel node NP2, and the light emitting element EE including the anode and a cathode that receives a pixel low power supply voltage ELVSS.

In such an embodiment, the pixel may further include a storage capacitor CST including a first electrode that receives the pixel high power supply voltage ELVDD and a second electrode connected to the first pixel node NP1, and a boost capacitor CBOOST including a first electrode that receives the data write gate signal GW and a second electrode connected to the first pixel node NP1.

In an embodiment, the light emitting element initialization gate signal EB may be a previous signal of the data write gate signal GW.

In an embodiment, when the image displayed on the display panel 100 is a still image or the display panel 100 operates in an always on mode, a driving frequency of the display panel 100 may be reduced (or lowered) to reduce a power consumption. When all of the switching elements of the display panel 100 are the P-type transistor, a flicker may occur due to a leakage current of the switching elements in a low frequency driving mode. Therefore, some of the switching elements of the pixel may be the N-type transistor. In an embodiment, the third pixel switching element PT3 and the fourth pixel switching element PT4 may be the N-type transistor, and the first pixel switching element PT1, the second pixel switching element PT2, the fifth pixel switching element PT5, the sixth pixel switching element PT6, the seventh pixel switching element PT7, and the eighth pixel switching element PT8 may be the P-type transistor.

In an embodiment, some of the switching elements of the pixel are the N-type transistor, and other switching elements are the P-type transistor, but the invention is not limited thereto. The invention may also be applied to pixels including only the N-type transistors. The invention may also be applied to pixels including only the P-type transistors.

Figure 3:
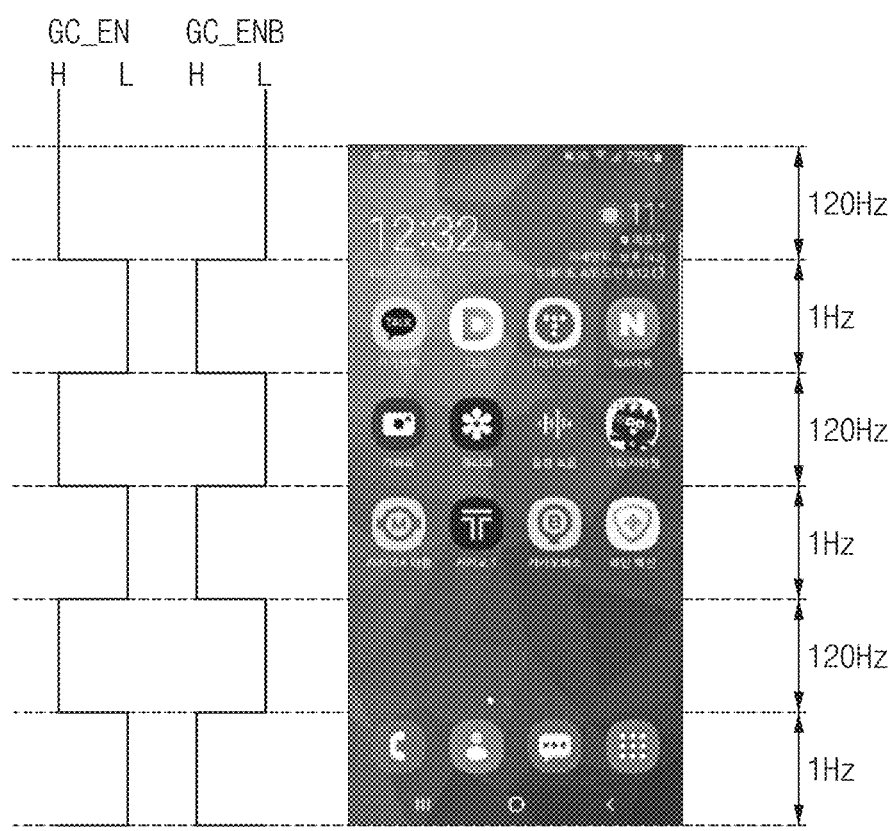
FIG. 3 is a conceptual diagram illustrating an enable signal and an inverted enable signal applied to a gate driver of FIG. 1 depending on a driving frequency of each region of a display panel of FIG. 1.

FIG. 3 is a conceptual diagram illustrating an enable signal and an inverted enable signal applied to a gate driver of FIG. 1 depending on a driving frequency of each region of a display panel of FIG. 1.

Referring to FIG. 3, depending on an enable signal GC_EN and an inverted enable signal GC_ENB, the gate driver 300 may output a gate pulse at a high frequency (e.g., 120 Hz) for a region of the display panel 100 which operates (e.g., is desired or set to operate) with a high frequency driving, and a gate pulse at low frequency (e.g., 1 Hz) for a region of the display panel 100 which operates with a low frequency driving.

Figure 4:
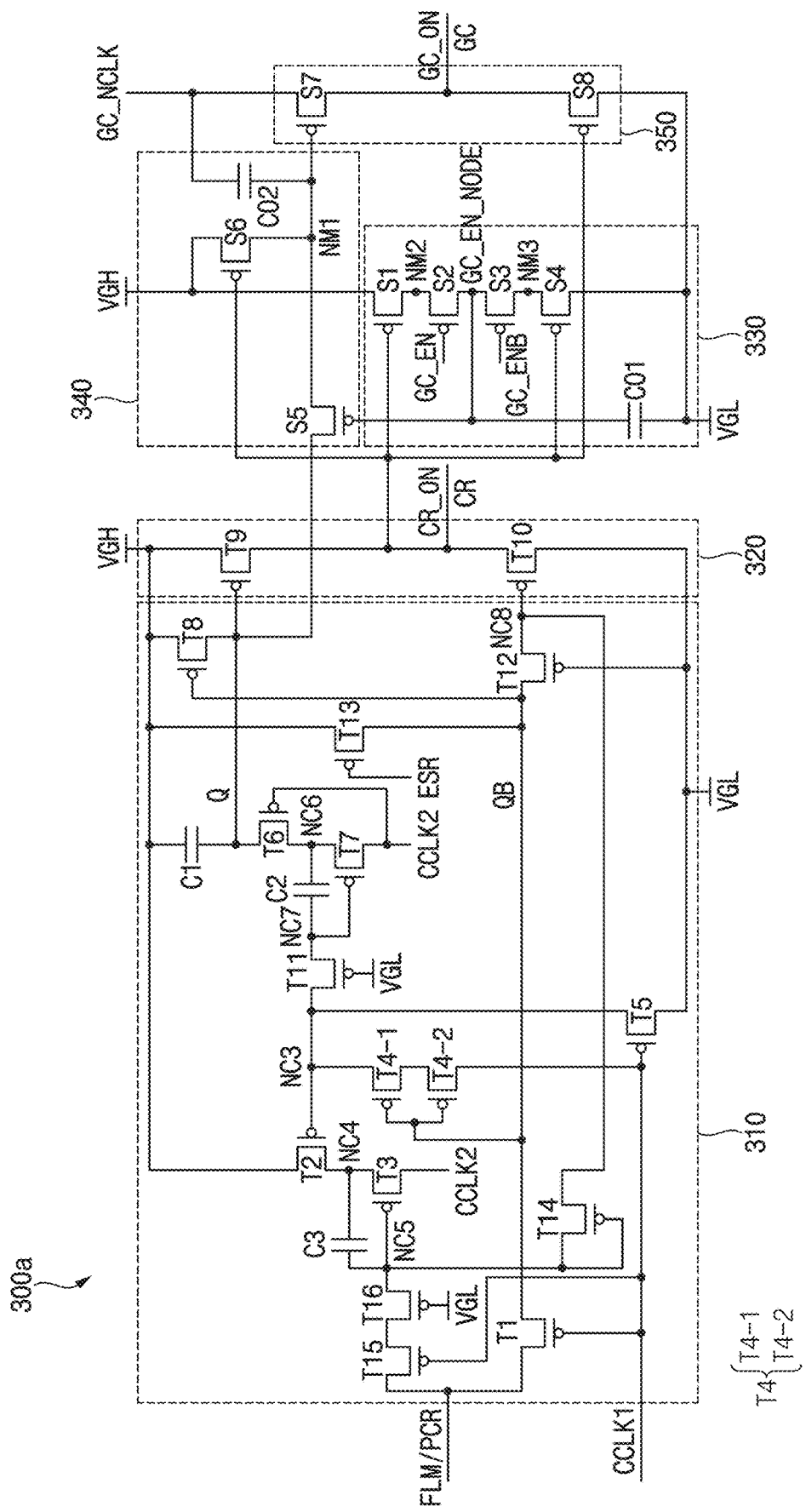
FIG. 4 is a circuit diagram illustrating an embodiment of a gate driver of FIG. 1.

FIG. 4 is a circuit diagram illustrating an embodiment of a gate driver of FIG. 1.

Referring to FIG. 4, an embodiment of a gate driver 300a may include a control circuit 310 which controls a voltage of a first control node Q and a voltage of a second control node QB in response to an input signal FLM/PCR, a first control clock signal CCLK1, and a second control clock signal CCLK2, a carry output circuit 320 which generates a carry signal CR in response to the voltage of the first control node Q and the voltage of the second control node QB, an enable node control circuit 330 which controls a voltage of an enable node GC_EN_NODE in response to the carry signal CR, an enable signal GC_EN, and an inverted enable signal GC_ENB, a masking circuit 340 which controls a voltage of a first intermediate node NM1 in response to the voltage of the first control node Q, the carry signal CR, and the voltage of the enable node GC_EN_NODE, and a gate output circuit 350 which outputs a gate signal GC in response to the carry signal CR, the voltage of the first intermediate node NM1, and an output clock signal GC_N-CLK. The input signal FLM/PCR may be a gate start signal FLM or a previous carry signal PCR. In an embodiment, the gate driver 300a may include a plurality of stages, and a stage of the stages may include the control circuit 310, the carry output circuit 320, the enable node control circuit, 330, the masking circuit 340 and the gate output circuit 350. The gate start signal FLM may be a signal which starts an operation of a first stage among the stages included in the gate driver 300a. The previous carry signal PCR of a stage may be a carry signal output from any one of previous stages thereof.

The control circuit 310 may include first to eighth gate switching elements T1 to T8, eleventh to sixteenth gate switching elements T11 to T16, and first to third gate capacitors C1 to C3.

The first gate switching element T1 may include a gate electrode that receives the first control clock signal CCLK1, a first electrode that receives the input signal FLM/PCR, and a second electrode connected to the second control node QB.

The second gate switching element T2 may include a gate electrode connected to a third control node NC3, a first electrode that receives a high gate voltage VGH, and a second electrode connected to a fourth control node NC4.

The third gate switching element T3 may include a gate electrode connected to a fifth control node NC5, a first electrode that receives the second control clock signal CCLK2, and a second electrode connected to the fourth control node NC4.

The fourth gate switching element T4 may include a gate electrode connected to the second control node QB, a first electrode that receives the first control clock signal CCLK1, and a second electrode connected to the third control node NC3. The fourth gate switching element T4 may include a first fourth gate switching element T4-1 and a second fourth gate switching element T4-2. That is, the fourth gate switching element T4 may have a dual gate structure.

The fifth gate switching element T5 may include a gate electrode that receives the first control clock signal CCLK1, a first electrode that receives a low gate voltage VGL, a second electrode connected to the third control node NC3.

The sixth gate switching element T6 may include a gate electrode that receives the second control clock signal CCLK2, a first electrode connected to a sixth control node NC6, and a second electrode connected to the first control node Q.

The seventh gate switching element T7 may include a gate electrode connected to a seventh control node NC7, a first electrode that receives the second control clock signal CCLK2, and a second electrode connected to the sixth control node NC6.

The eighth gate switching element T8 may include a gate electrode connected to the second control node QB, a first electrode that receives the high gate voltage VGH, and a second electrode connected to the first control node Q.

The eleventh gate switching element T11 may include a gate electrode that receives the low gate voltage VGL, a first electrode connected to the third control node NC3, and a second electrode connected to the seventh control node NC7.

The twelfth gate switching element T12 may include a gate electrode that receives the low gate voltage VGL, a first electrode connected to the second control node QB, and a second electrode connected to an eighth control node NC8.

The thirteenth gate switching element T13 may include a gate electrode that receives a global control signal ESR, a first electrode that receives the high gate voltage VGH, and a second electrode connected to the second control node QB. The global control signal ESR may be applied to the stages of the gate driver 300 at substantially a same time, and the stages may output the gate signals GC substantially simultaneously in response to the global control signal ESR.

The fourteenth gate switching element T14 may include a gate electrode connected to the fifth control node NC5, a first electrode connected to the eighth control node NC8, and a second electrode connected to the fifth control node NC5.

The fifteenth gate switching element T15 may include a gate electrode that receives the first control clock signal CCLK1, a first electrode that receives the input signal FLM/PCR, and a second electrode connected to a first electrode of the sixteenth gate switching element T16.

The sixteenth gate switching element T16 may include a gate electrode that receives the low gate voltage VGL, the first electrode connected to the second electrode of the fifteenth gate switching element T15, and a second electrode connected to the fifth control node NC5.

The first gate capacitor C1 may include a first electrode that receives the high gate voltage VGH and a second electrode connected to the first control node Q.

The second gate capacitor C2 may include a first electrode connected to the seventh control node NC7 and a second electrode connected to the sixth control node NC6.

The third gate capacitor C3 may include a first electrode connected to the fifth control node NC5 and a second electrode connected to the fourth control node NC4.

The carry output circuit 320 may include a ninth gate switching element T9 and a tenth gate switching element T10.

The ninth gate switching element T9 may include a gate electrode connected to the first control node Q, a first electrode that receives the high gate voltage VGH, and a second electrode connected to a carry output node CR_ON. The carry signal CR may be output from the carry output node CR_ON.

The tenth gate switching element T10 may include a gate electrode connected to the eighth control node NC8, a first electrode that receives the low gate voltage VGL, and a second electrode connected to the carry output node CR_ON.

The enable node control circuit 330 may include first to fourth switching elements S1 to S4.

The first switching element S1 may include a gate electrode that receives the carry signal CR, a first electrode that receives the high gate voltage VGH, and a second electrode connected to a second intermediate node NM2.

The second switching element S2 may include a gate electrode that receives the enable signal GC_EN, a first electrode connected to the second intermediate node NM2, and a second electrode connected to the enable node GC_EN_NODE.

The third switching element S3 may include a gate electrode that receives the inverted enable signal GC_ENB, a first electrode connected to a third intermediate node NM3, and a second electrode connected to the enable node GC_EN_NODE.

The fourth switching element S4 may include a gate electrode that receives the carry signal CR, a first electrode that receives the low gate voltage VGL, and a second electrode connected to the third intermediate node NM3.

The enable node control circuit 330 may further include a first capacitor CO1.

The first capacitor CO1 may include a first electrode connected to the enable node GC_EN_NODE and a second electrode that receives the low gate voltage VGL.

The masking circuit 340 may include a fifth switching element S5 and a sixth switching element S6.

The fifth switching element S5 may include a gate electrode connected to the enable node GC_EN_NODE, a first electrode connected to the first control node Q, and a second electrode connected to the first intermediate node NM1.

The sixth switching element S6 may include a gate electrode that receives the carry signal CR, a first electrode that receives the high gate voltage VGH, and a second electrode connected to the first intermediate node NM1.

The masking circuit 340 may further include a second capacitor CO2.

The second capacitor CO2 may include a first electrode that receives the output clock signal GC_NCLK and a second electrode connected to the first intermediate node NM1.

The gate output circuit 350 may include a seventh switching element S7 and an eighth switching element S8.

The seventh switching element S7 may include a gate electrode connected to the first intermediate node NM1, a first electrode that receives the output clock signal GC_NCLK, and a second electrode connected to a gate output node GC_ON. The gate signal GC may be output from the gate output node GC_ON.

The eighth switching element S8 may include a gate electrode that receives the carry signal CR, a first electrode that receives the low gate voltage VGL, and a second electrode connected to the gate output node GC_ON.

Figure 5:
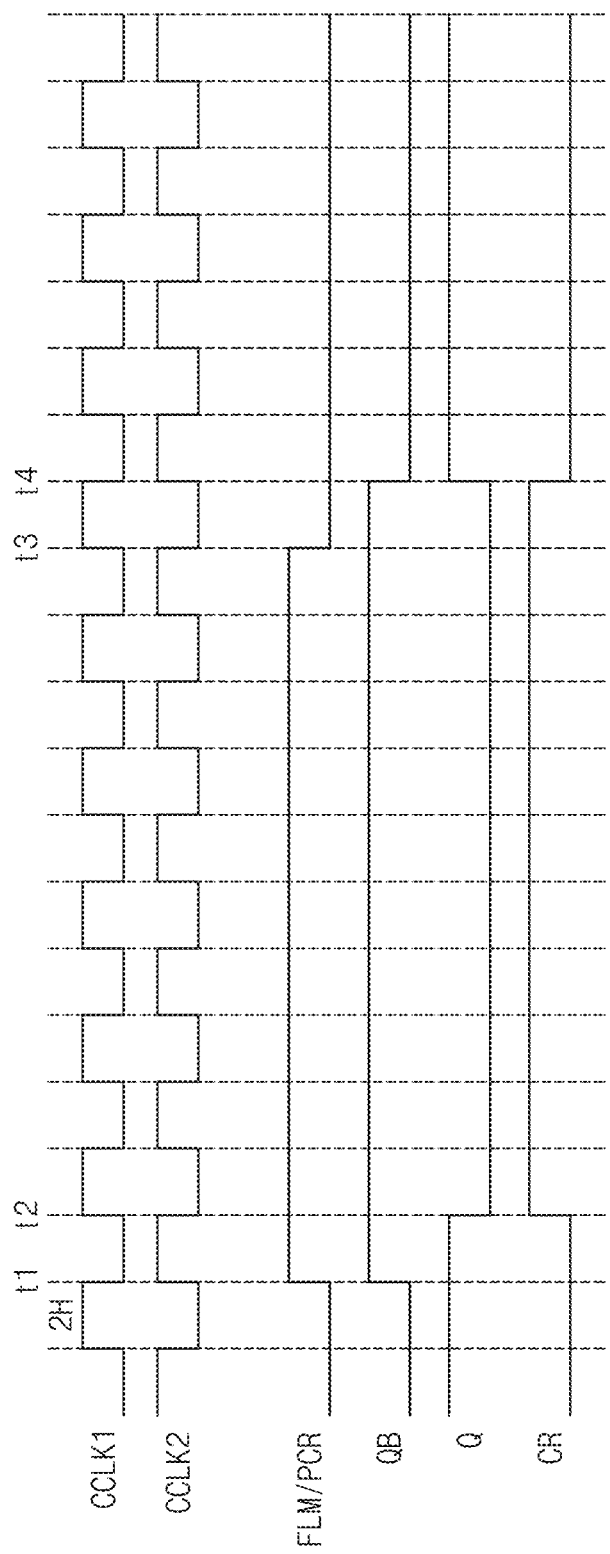
FIG. 5 is a signal timing diagram illustrating an embodiment of an input signal, control clock signals, node signals, and a carry signal of a gate driver of FIG. 4.
Figure 6:
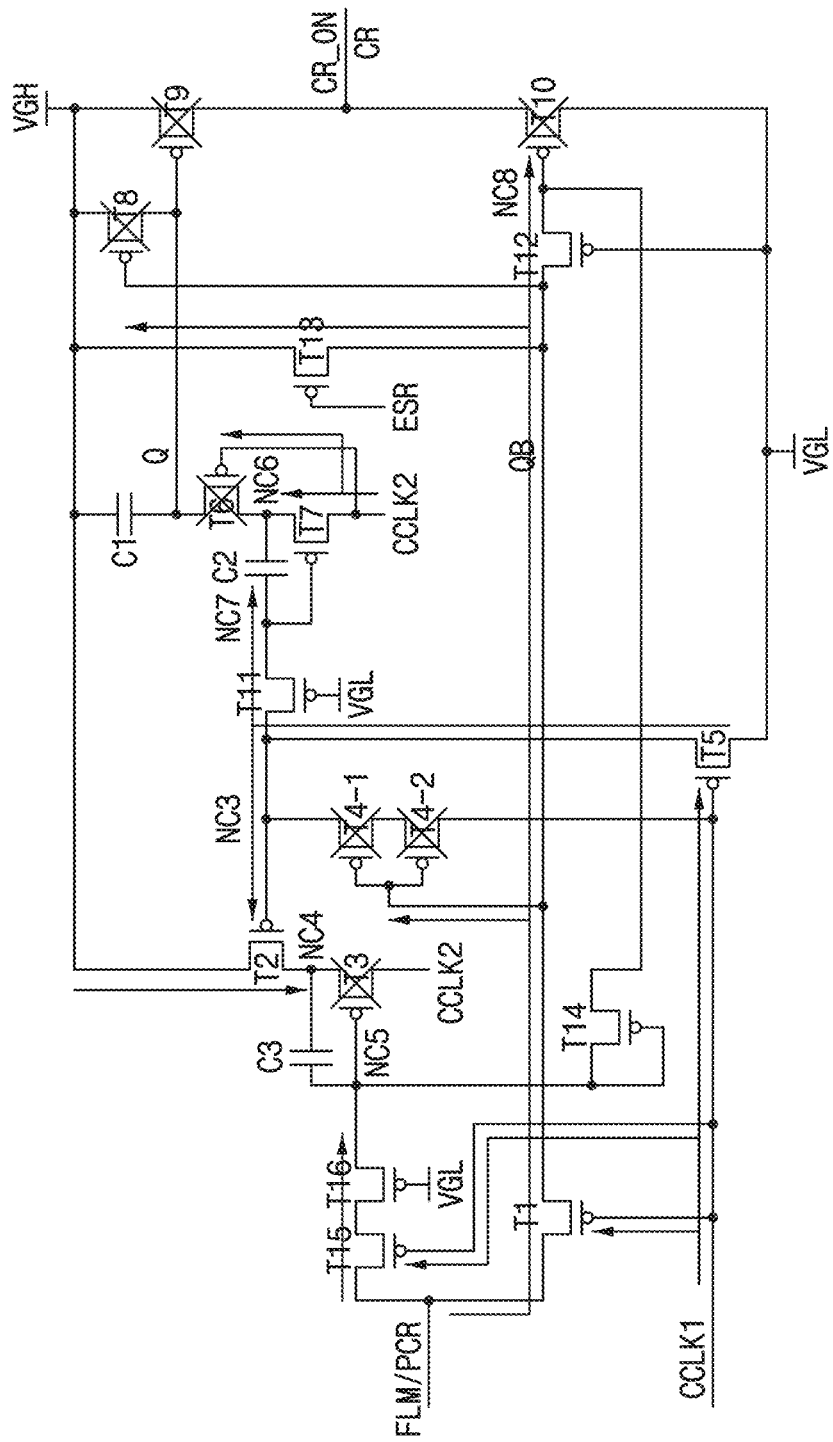
FIG. 6 is a circuit diagram illustrating operations of a control circuit and a carry output circuit of FIG. 4 at a first time of FIG. 5.
Figure 7:
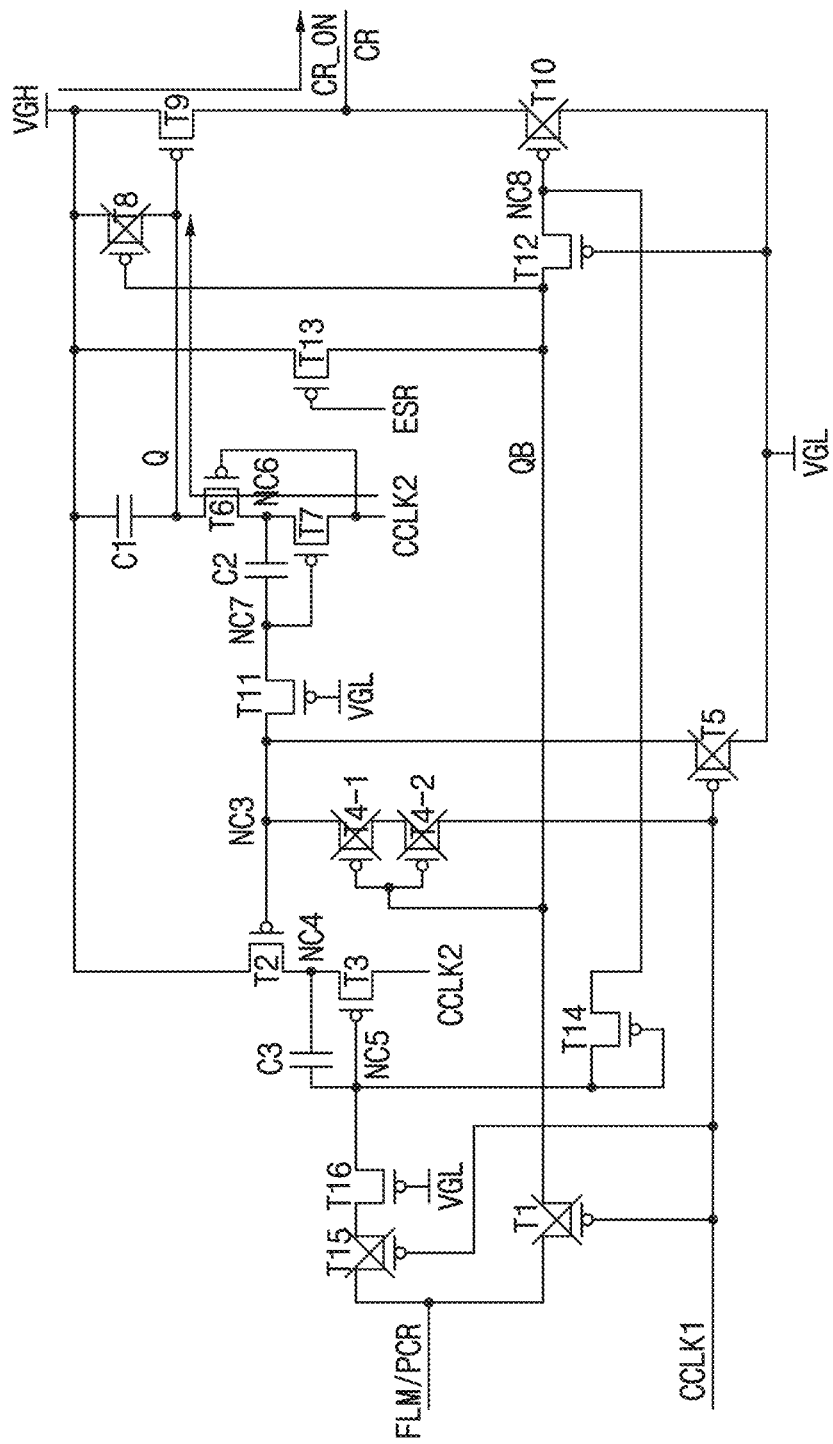
FIG. 7 is a circuit diagram illustrating operations of a control circuit and a carry output circuit of FIG. 4 at a second time of FIG. 5.
Figure 8:
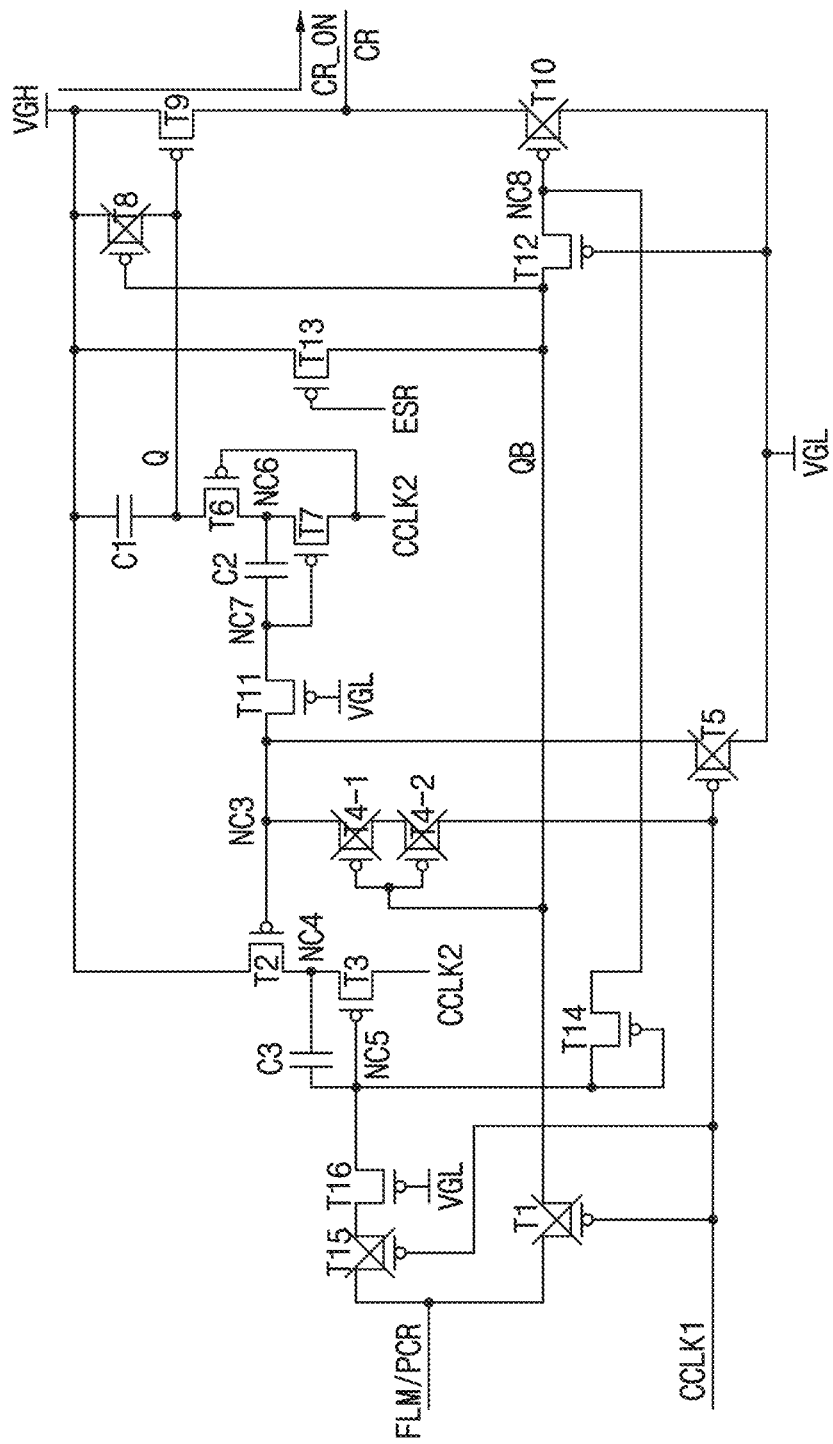
FIG. 8 is a circuit diagram illustrating operations of a control circuit and a carry output circuit of FIG. 4 at a third time of FIG. 5.
Figure 9:
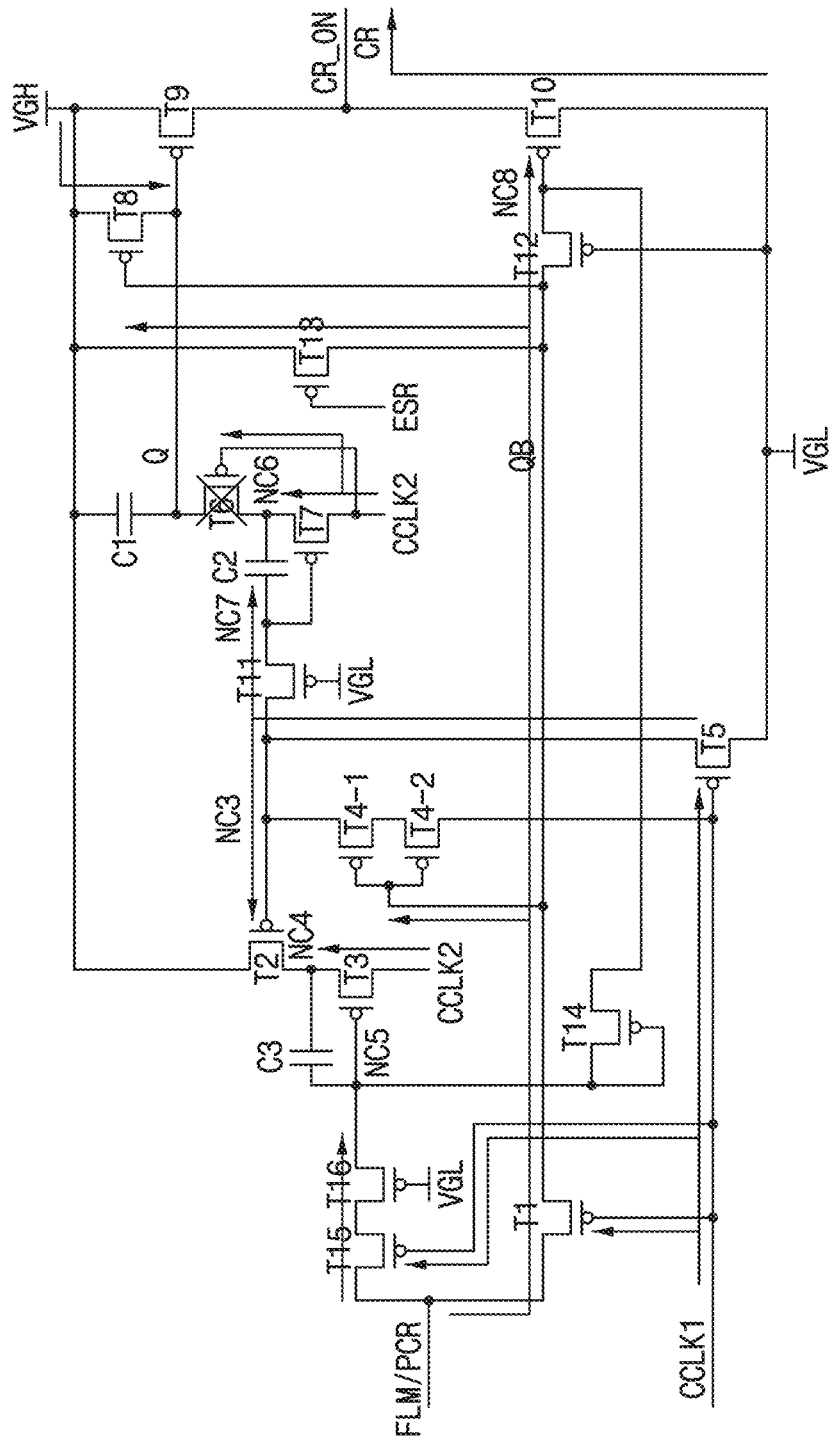
FIG. 9 is a circuit diagram illustrating operations of a control circuit and a carry output circuit of FIG. 4 at a fourth time of FIG. 5.

FIG. 5 is a signal timing diagram illustrating an embodiment of an input signal, control clock signals, node signals, and a carry signal of a gate driver of FIG. 4. FIG. 6 is a circuit diagram illustrating operations of a control circuit and a carry output circuit of FIG. 4 at a first time of FIG. 5. FIG. 7 is a circuit diagram illustrating operations of a control circuit and a carry output circuit of FIG. 4 at a second time of FIG. 5. FIG. 8 is a circuit diagram illustrating operations of a control circuit and a carry output circuit of FIG. 4 at a third time of FIG. 5. FIG. 9 is a circuit diagram illustrating operations of a control circuit and a carry output circuit of FIG. 4 at a fourth time of FIG. 5.

Referring to FIGS. 5 to 9, operations of the control circuit 310 and the carry output circuit 320 will be described.

In FIG. 6, at a first time (or a first time point) t1, the first control clock signal CCLK1 may change from a first level (e.g., a high level) to a second level (e.g., a low level), the second control clock signal CCLK2 may change from the second level to the first level, and the input signal FLM/PCR may change from the second level to the first level, the first control clock signal CCLK1 and the second control clock signal CCLK2 may have active pulses having 2 horizontal times 2H.

The first gate switching element T1 may be turned on in response to the first control clock signal CCLK1 having the second level, and apply the input signal FLM/PCR having the first level to the second control node QB. The twelfth gate switching element T12 may be turned on in response to the low gate voltage VGL (i.e., the second level), and apply the voltage of the second control node QB having the first level to the eighth control node NC8.

The fifteenth gate switching element T15 may be turned on in response to the first control clock signal CCLK1 having the second level, the sixteenth gate switching element T16 may be turned on in response to the low gate voltage VGL, the fifteenth gate switching element T15 and the sixteenth gate switching element T16 may apply the input signal FLM/PCR having the first level to the fifth control node NC5.

The fifth gate switching element T5 may be turned on in response to the first control clock signal CCLK1 having the second level, and apply the low gate voltage VGL to the third control node NC3.

The second gate switching element T2 may be turned on in response to a voltage of the third control node NC3 having the second level, apply the high gate voltage VGH (i.e., the first level) to the fourth control node NC4.

The eleventh gate switching element T11 may be turned on in response to the low gate voltage VGL, and apply the voltage of the third control node NC3 having the second level to the seventh control node NC7.

The seventh gate switching element T7 may be turned on in response to a voltage of the seventh control node NC7 having the second level, and apply the second control clock signal CCLK2 having the first level to the sixth control node NC6.

The second gate capacitor C2 may be charged based on the voltage of the seventh control node NC7 having the second level and the voltage of the sixth control node NC6 having the first level.

The sixth gate switching element T6 may be turned off in response to the second control clock signal CCLK2 having the first level, and the eighth gate switching element T8 may be turned off in response to the voltage of the second control node QB have the first level. Therefore, the first gate capacitor C1 may maintain the voltage of the first control node Q at the first level, which is a previous level of the voltage of the first control node Q. Accordingly, the ninth gate switching element T9 may be turned off in response to the voltage of the first control node Q having the first level.

In FIG. 7, at a second time (or a second time point) t2, the first control clock signal CCLK1 may change from the second level to the first level, the second control clock signal CCLK2 may change from the first level to the second level, and the input signal FLM/PCR may be maintained at the first level.

The first gate switching element T1 may be turned off in response to the first control clock signal CCLK1 having the first level, and the fourth gate switching element T4 may be turned off in response to the voltage of the second control node QB having the first level, and the fifth gate switching element T5 may be turned off in response to the first control clock signal CCLK1 having the first level. Therefore, the second gate capacitor C2 may maintain the voltage of the seventh control node NC7 at the second level which is a previous level of the voltage of the seventh control node NC7.

The seventh gate switching element T7 may be turned on in response to the voltage of the seventh control node NC7 having the second level, and the sixth gate switching element T6 may be turned on in response to the second control clock signal CCLK having the second level. Therefore, the seventh gate switching element T7 and the sixth gate switching element T6 may apply the second control clock signal CCLK2 having the second level to the first control node Q.

The ninth gate switching element T9 may be turned on in response to the voltage of the first control node Q having the second level, and apply the high gate voltage VGH to the carry output node CR_ON.

In FIG. 8, at a third time (or a third time point) t3, the first control clock signal CCLK1 may change from the second level to the first level, the second control clock signal CCLK2 may change from the first level to the second level, and the input signal FLM/PCR may change from the first level to the second level.

The first gate switching element T1 may be turned off in response to the first control clock signal CCLK1 having the first level. The voltage of the second control node may be maintained at the first level.

The tenth gate switching element T10 may be turned off in response to the voltage of the eighth control node NC8 having the first level.

The seventh gate switching element T7 may be turned on in response to the voltage of the seventh control node NC7 having the second level, and the sixth gate switching element T6 may be turned on in response to the second control clock signal CCLK2 having the second level. Therefore, the seventh gate switching element T7 and the sixth gate switching element T6 may apply the second control clock signal CCLK2 having the second level to the first control node Q.

The ninth gate switching element T9 may be turned on in response to the voltage of the first control node Q having the second level, and apply the high gate voltage VGH to the carry output node CR_ON.

In FIG. 9, at a fourth time (or a fourth time point) t4, the first control clock signal CCLK1 may change from the first level to the second level, the second control clock signal CCLK2 may change from the second level to the first level, and the input signal FLM/PCR may be maintained at the second level.

The first gate switching element T1 may be turned on in response to the first control clock signal CCLK1 having the second level, and apply the input signal FLM/PCR having the second level to the second control node QB. The twelfth gate switching element T12 may be turned on in response to the low gate voltage VGL, and apply the voltage of the second control node QB having the first level to the eighth control node NC8.

The tenth gate switching element T10 may be turned on in response to the voltage of the eighth control node NC8 having the second level, and apply the low gate voltage VGL to the carry output node CR_ON.

As such, the carry output circuit 320 may output the carry signal CR having the first level during a period between the second time t2 and the fourth time t4. In addition, when the voltage of the first control node Q has the first level, the carry signal CR may have the second level, and when the voltage of the first control node Q has the second level, the carry signal CR may have the first level.

FIGS. 4 to 9 show an embodiment of the control circuit 310 and the carry output circuit 320 which include the first to sixteenth transistors T1 to T16 and the first to third gate capacitors C1 to C3, but a configuration of the control circuit 310 and the carry output circuit 320 of the gate driver 300a according to embodiments of the invention is limited to those shown in FIGS. 4 to 9. In an embodiment, the control circuit 310 and the carry output circuit 320 may have any configuration where when the voltage of the first control node Q has the first level, the carry signal CR may have the second level, and when the voltage of the first control node Q has the second level, the carry signal CR may have the first level.

Figure 10:
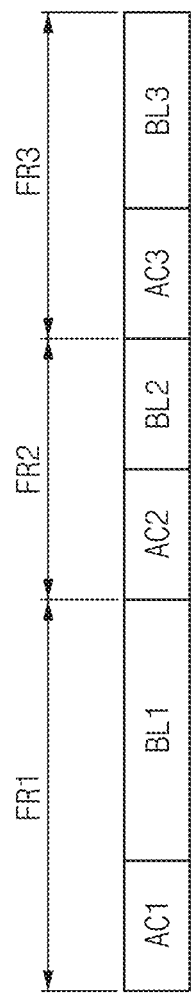
FIG. 10 is a conceptual diagram illustrating a driving frequency of a display panel of FIG. 1.

FIG. 10 is a conceptual diagram illustrating a driving frequency of a display panel of FIG. 1.

Referring to FIG. 10, in an embodiment, the display panel 100 may be driven at a variable frequency. A first frame FR1 having a first frequency may include a first active period AC1 and a first blank period BL1. The second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a length which is equal to a length of the second active period AC2, and the first blank period BL1 may have a length which is different from a length of the second active period BL2.

The second active period AC2 may have a length which is equal to a length of the third active period AC3, and the second blank period BL2 may have a length which is from a length of the third blank period BL3.

The display device 10 supporting (or operable with) the variable frequency may have a data writing period in which the data voltage VDATA is written to the pixel and a self scan period in which the data voltage VDATA is not written to the pixel and the pixel only emits the light. The data writing period may be placed or defined within the active periods AC1, AC2, AC3. The self-scan period may be placed or defined within the blank periods BL1, BL2, and BL3.

In an embodiment where the display panel 100 is allowed to be driven at the variable frequency, the data voltage VDATA may be applied to the pixel by the data write gate signal GW in the active period and be stored in the storage capacitor CST. The data voltage VDATA stored in the storage capacitor CST may be initialized by the compensation gate signal GC and the data initialization gate signal GI. That is, the length of the blank period may be adjusted by the data write gate signal GW, the compensation gate signal GC, and the data initialization gate signal GI.

In the active period, when the compensation gate signal GC has at least two active pulses and the data initialization gate signal GI has one active pulse, the display panel 100 may be driven more effectively at the variable frequency.

Figure 11:
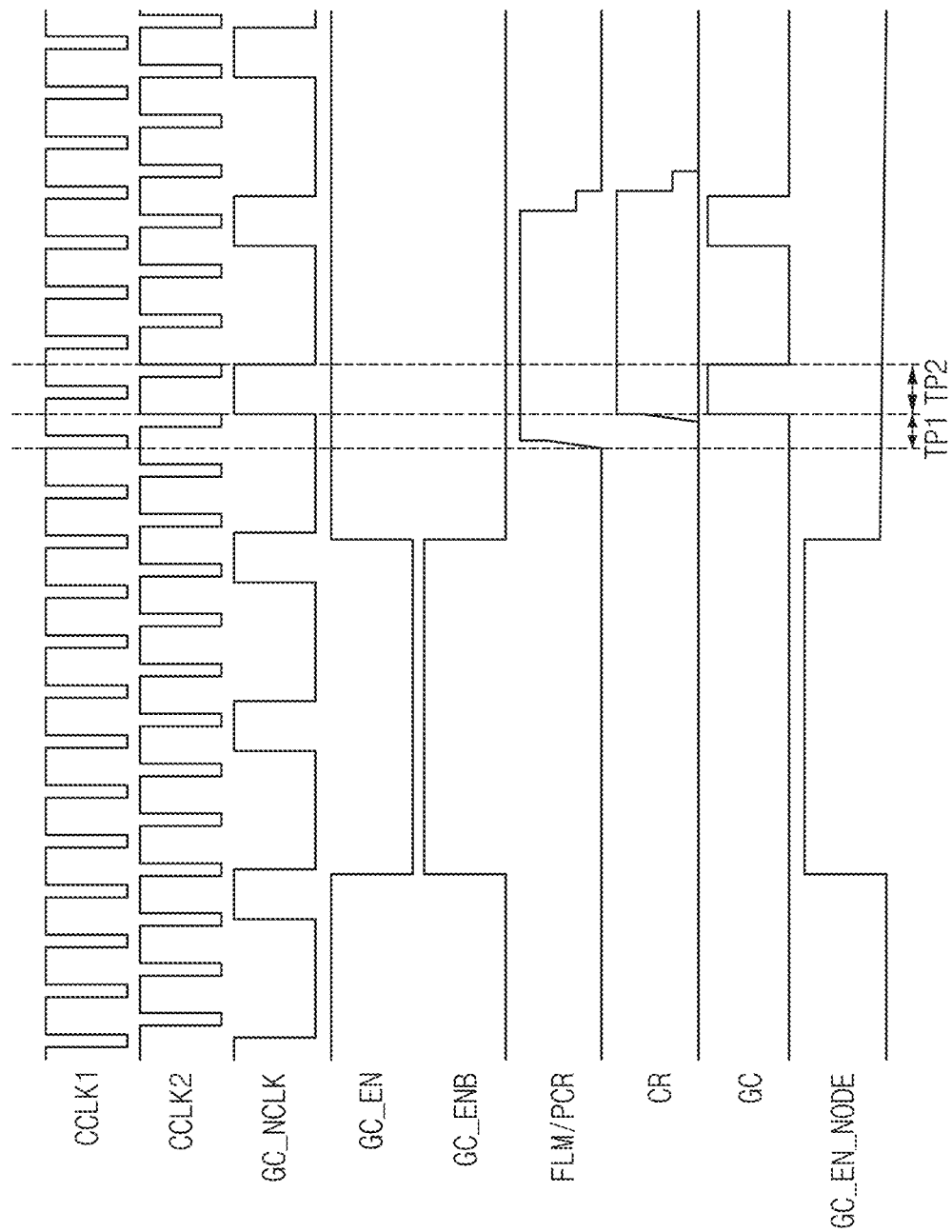
FIG. 11 is a signal timing diagram illustrating an embodiment of an operation of a gate driver of FIG. 4 when an enable signal has a first level.
Figure 12:
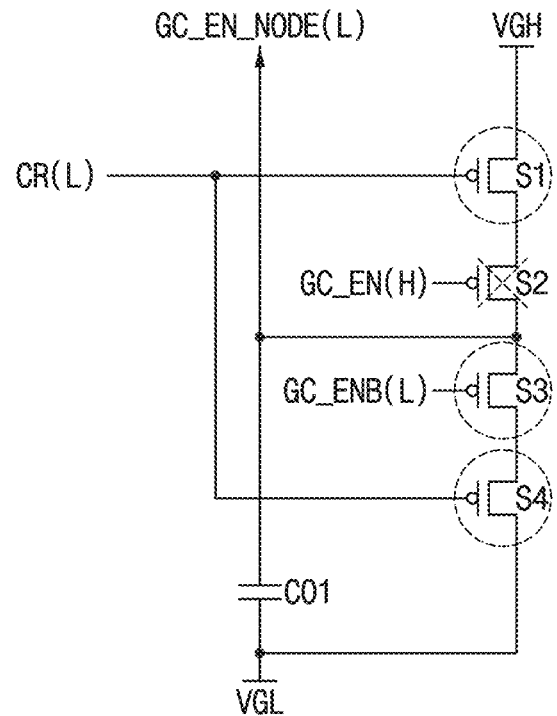
FIG. 12 is a circuit diagram illustrating an operation of an enable node control circuit of FIG. 4 in a first time period of FIG. 11.
Figure 13:
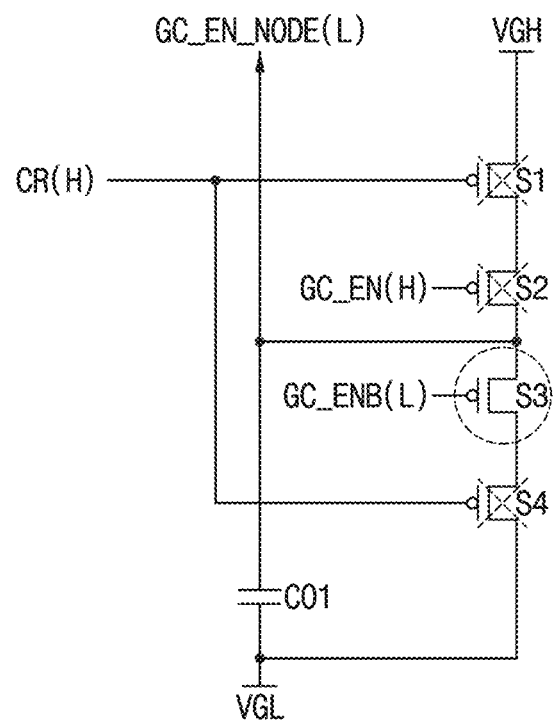
FIG. 13 is a circuit diagram illustrating an operation of an enable node control circuit of FIG. 4 in a second time period of FIG. 11.
Figure 14:
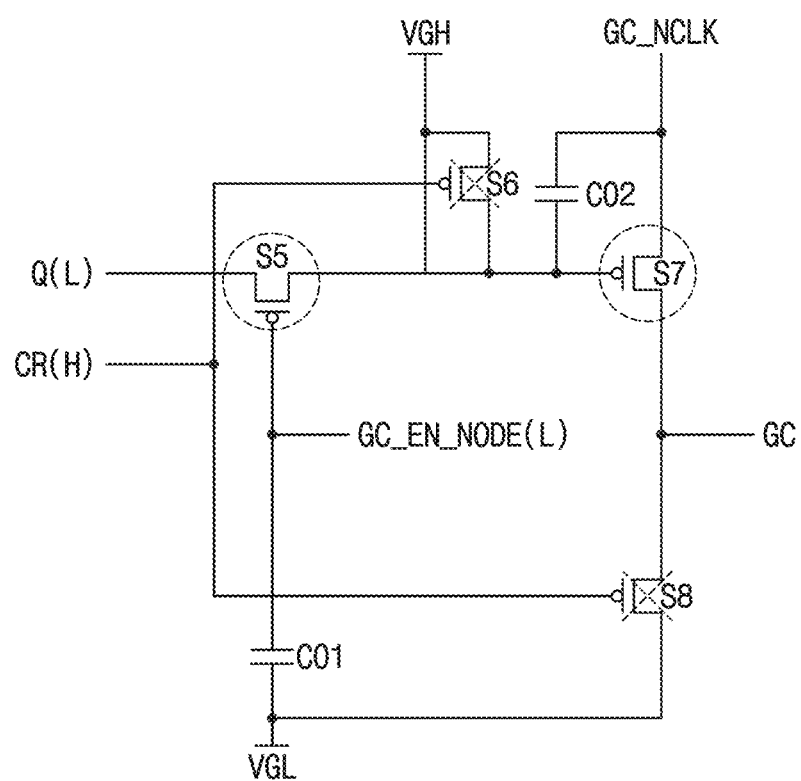
FIG. 14 is a circuit diagram illustrating operations of a masking circuit and a gate output circuit of FIG. 4 in a second time period of FIG. 11.

FIG. 11 is a signal timing diagram illustrating an embodiment of an operation of a gate driver of FIG. 4 when an enable signal has a first level. FIG. 12 is a circuit diagram illustrating an operation of an enable node control circuit of FIG. 4 in a first time period of FIG. 11. FIG. 13 is a circuit diagram illustrating an operation of an enable node control circuit of FIG. 4 in a second time period of FIG. 11. FIG. 14 is a circuit diagram illustrating operations of a masking circuit and a gate output circuit of FIG. 4 in a second time period of FIG. 11.

Referring to FIGS. 11 to 14, when the enable signal GC_EN has the first level before the carry signal CR having the first level is output, the enable node control circuit 330 may control a voltage of the enable node GC_EN_NODE to the second level, while the carry signal CR having the first level is output, the masking circuit 340 may control the voltage of the first intermediate node NM1 to the second level in response to the voltage of the enable node GC_EN_NODE having the second level, and while the carry signal CR having the first level is output, the gate output circuit 350 may output the gate signal GC having the first level in response to the voltage of the first intermediate node NM1 having the second level.

In FIG. 12, in a first time period TP1, the first switching element S1 and the fourth switching element S4 may be turned on in response to the carry signal CR having the second level, the third switching element S3 may be turned on in response to the inverted enable signal GC_ENB having the second level, and the second switching element S2 may be turned off in response to the enable signal GC_EN having the first level. Therefore, the third switching element S3 and the fourth switching element S4 may apply the low gate voltage VGL to the enable node GC_EN_NODE. As such, when the carry signal CR having the first level is not output, the enable signal GC_EN has the first level, and the inverted enable signal GC_ENB has the second level, the enable node control circuit 330 may control the voltage of the enable node GC_EN_NODE to the second level.

In FIG. 13, in a second time period TP2 after the first time period TP1, the third switching element S3 may be turned on in response to the inverted enable signal GC_ENB having the second level, the first switching element S1 and the fourth switching element S4 may be turned off in response to the carry signal CR having the first level, and the second switching element S2 may be turned off in response to the enable signal GC_EN having the first level. Therefore, the high gate voltage VGH and the low gate voltage VGL may not be applied to the enable node GC_EN_NODE, and the first capacitor CO1 may maintain the voltage of the enable node GC_EN_NODE at the previous level (i.e., the second level).

In FIG. 14, in the second time period TP2, the fifth switching element S5 may be turned on in response to the voltage of the enable node GC_EN_NODE having the second level, and apply the voltage of the first control node Q having the second level to the first intermediate node NM1. The sixth switching element S6 may be turned off in response to the carry signal CR having the first level. Therefore, the seventh switching element S7 may be turned on in response to the voltage of the first intermediate node NM1 having the second level and apply the output clock signal GC_NCLK having the first level to the gate output node GC_ON.

As such, while the carry signal CR has the first level, the first capacitor CO1 may maintain the voltage of the enable node GC_EN_NODE at the previous level (i.e., the second level). When the carry signal CR has the first level, the voltage of the first control node Q may have the second level such that the fifth switching element S5 may be turned on in response to the voltage of the enable node GC_EN_NODE having the second level, and apply the voltage of the first control node Q having the second level to the first intermediate NM1, and the seventh switching element S7 may be turned on in response to the voltage of the first intermediate node NM1 having the second level, and apply the output clock signal GC_NCLK to the gate output node GC_ON. Accordingly, while the carry signal CR has the first level, the gate signal GC corresponding to the output clock signal GC_NCLK may be output from the gate output node GC_ON. While the carry signal CR has the first level, the output clock signal GC_NCLK may have two active pulses having the first level such that the gate signal GC may have two active pulses having the first level.

Figure 15:
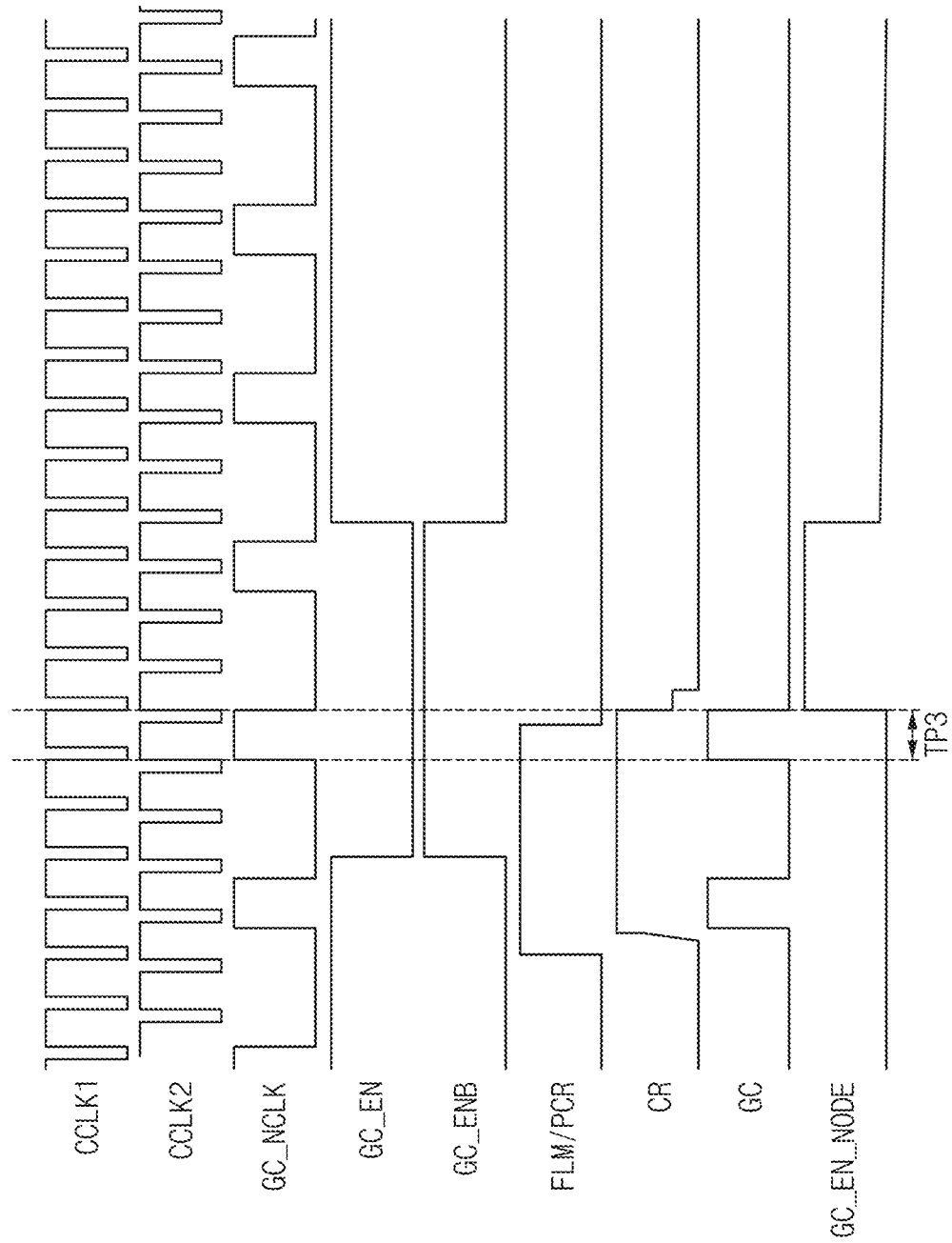
FIG. 15 is a signal timing diagram illustrating an embodiment of an operation of a gate driver of FIG. 4 when an enable signal changes from a first level to a second level while a carry signal is output.
Figure 16:
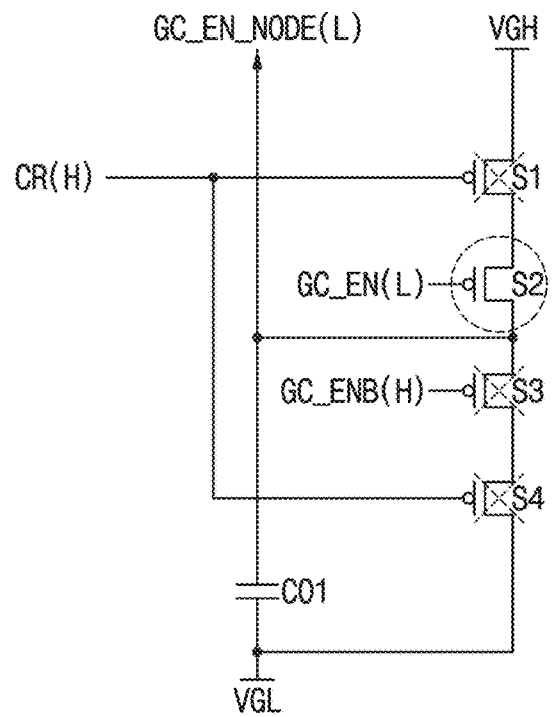
FIG. 16 is a circuit diagram illustrating an operation of an enable node control circuit of FIG. 4 in a third time period of FIG. 15.
Figure 17:
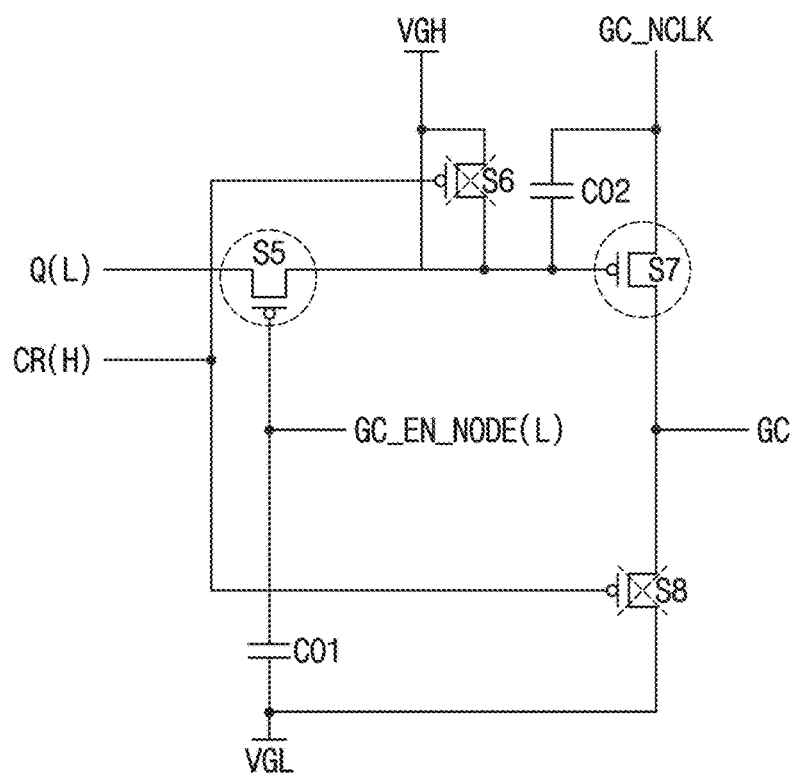
FIG. 17 is a circuit diagram illustrating operations of a masking circuit and a gate output circuit of FIG. 4 in a third time period of FIG. 15.

FIG. 15 is a signal timing diagram illustrating an embodiment of an operation of a gate driver of FIG. 4 when an enable signal changes from a first level to a second level while a carry signal is output. FIG. 16 is a circuit diagram illustrating an operation of an enable node control circuit of FIG. 4 in a third time period of FIG. 15. FIG. 17 is a circuit diagram illustrating operations of a masking circuit and a gate output circuit of FIG. 4 in a third time period of FIG. 15.

Referring to FIGS. 15 to 17, when the enable signal GC_EN changes from the first level to the second level while the carry signal CR having the first level is output, the enable node control circuit 330 may maintain the voltage of the enable node GC_EN_NODE at the second level until an output of the carry signal CR having the first level is completed.

In FIG. 16, in a third time period TP3, the second switching element S2 may be turned on in response to the enable signal GC_EN having the second level, the first switching element S1 and the fourth switching element S4 may be turned off in response to the carry signal CR having the first level, and the third switching element S3 may be turned off in response to the inverted enable signal GC_ENB having the first level. Therefore, the high gate voltage VGH and the low gate voltage VGL may not be applied to the enable node GC_EN_NODE, and the first capacitor CO1 may maintain the voltage of the enable node GC_EN_NODE to the previous level (i.e., the second level).

In FIG. 17, in the third time period TP3, the fifth switching element S5 may be turned on in response to the voltage of the enable node GC_EN_NODE having the second level, and apply the voltage of the first control node Q having the second level to the first intermediate node NM1. The sixth switching element S6 may be turned off in response to the carry signal CR having the first level. Therefore, the seventh switching element S7 may be turned on in response to the voltage of the first intermediate node NM1 having the second level and apply the output clock signal GC_NCLK having the first level to the gate output node GC_ON.

As such, while the carry signal CR has the first level, the first capacitor CO1 may maintain the voltage of the enable node GC_EN_NODE at the previous level (i.e., the second level). Although the enable signal GC_EN changes from the first level to the second level while the carry signal CR having the first level is output, the first switching element S1 and the fourth switching element S4 may be turned off such that the voltage of the enable node GC_EN_NODE may be still maintained at the previous level (i.e., the second level). Accordingly, while the carry signal CR has the first level, the gate signal GC corresponding to the output clock signal GC_NCLK may be output from the gate output node GC_ON. While the carry signal CR has the first level, the output clock signal GC_NCLK may have two active pulses having the first level such that the gate signal GC may have two active pulses having the first level.

Figure 18:
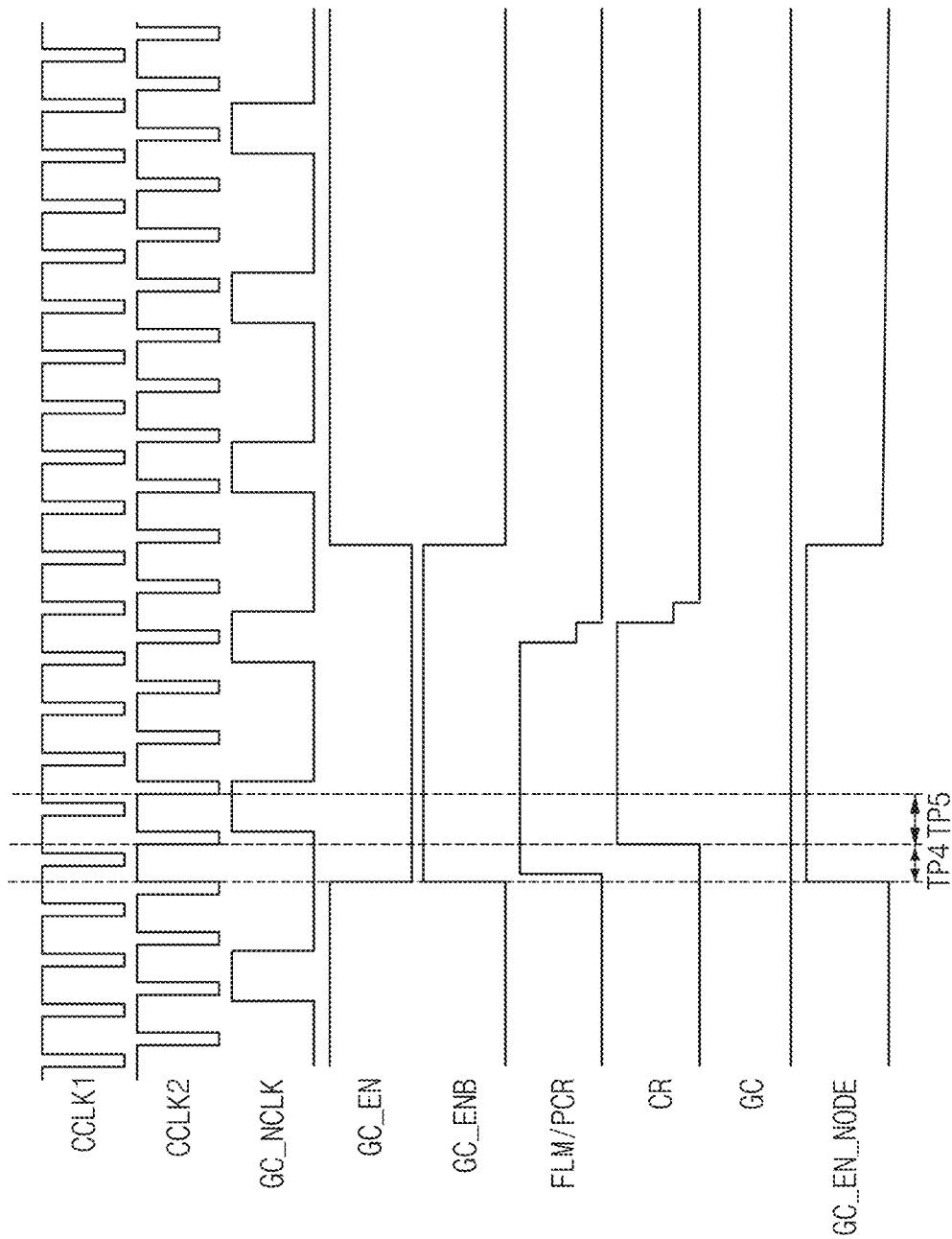
FIG. 18 is a signal timing diagram illustrating an embodiment of an operation of a gate driver of FIG. 4 when an enable signal has a second level.
Figure 19:
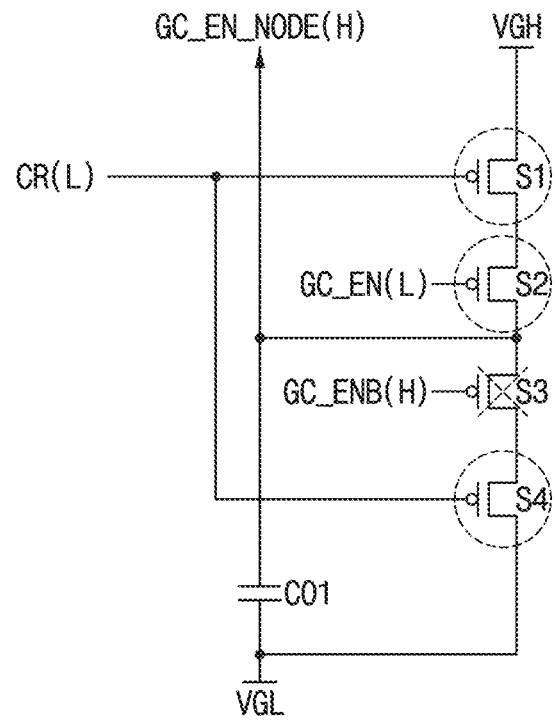
FIG. 19 is a circuit diagram illustrating an operation of an enable node control circuit of FIG. 4 in a fourth time period of FIG. 18.
Figure 20:
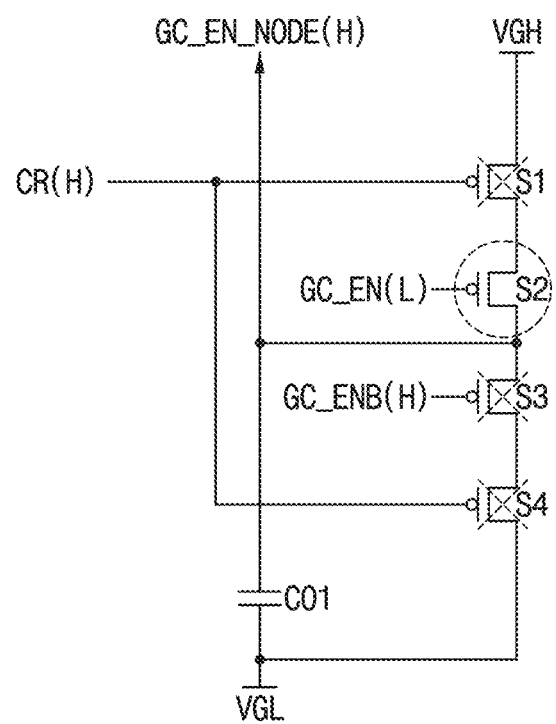
FIG. 20 is a circuit diagram illustrating an operation of an enable node control circuit of FIG. 4 in a fifth time period of FIG. 18.
Figure 21:
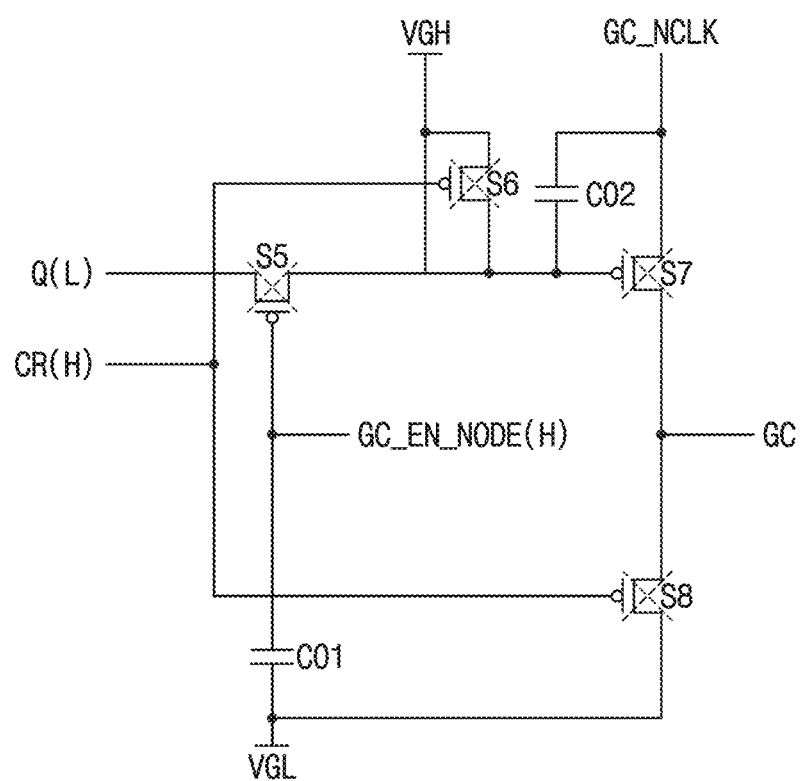
FIG. 21 is a circuit diagram illustrating operations of a masking circuit and a gate output circuit of FIG. 4 in a fifth time period of FIG. 18.

FIG. 18 is a signal timing diagram illustrating an embodiment of an operation of a gate driver of FIG. 4 when an enable signal has a second level. FIG. 19 is a circuit diagram illustrating an operation of an enable node control circuit of FIG. 4 in a fourth time period of FIG. 18. FIG. 20 is a circuit diagram illustrating an operation of an enable node control circuit of FIG. 4 in a fifth time period of FIG. 18. FIG. 21 is a circuit diagram illustrating operations of a masking circuit and a gate output circuit of FIG. 4 in a fifth time period of FIG. 18.

Referring to FIGS. 18 to 21, when the enable signal GC_EN has the second level before the carry signal CR having the first level is output, the enable node control circuit 330 may control the voltage of the enable node GC_EN_NODE to the first level, while the carry signal CR having the first level is output, the masking circuit 340 may control the voltage of the first intermediate node NM1 to the first level in response to the voltage of enable node GC_EN_NODE having the first level, and while the carry signal CR having the first level is output, the gate output circuit 350 may not output the gate signal GC having the first level in response to the voltage of the first intermediate node NM1 having the first level.

In FIG. 19, in a fourth time period TP4, the first switching element S1 may be turned on in response to the carry signal CR having the second level, the fourth switching element S4 may be turned on in response to the carry signal CR having the second level, the second switching element S2 may be turned on in response to the enable signal GC_EN having the second level, and the third switching element S3 may be turned off in response to the inverted enable signal GC_ENB having the first level. Therefore, the first switching element S1 and the second switching element S2 may apply the high gate voltage VGH (i.e., the first level) to the enable node GC_EN_NODE. As such, when the carry signal CR having the first level is not output, the enable signal GC_EN has the second level, and the inverted enable signal GC ENB has the first level, the enable node control circuit 330 may control the voltage of the enable node GC_EN_NODE to the first level.

In FIG. 20, in a fifth time period TP5 after the fourth time period TP4, the second switching element S2 may be turned on in response to the enable signal GC_EN having the second level, the first switching element S1 may be turned off in response to the carry signal CR having the first level, the fourth switching element S4 may be turned off in response to the carry signal CR having the first level, and the third switching element S3 may be turned off in response to the inverted enable signal GC_ENB having the first level. Therefore, the high gate voltage VGH and the low gate voltage VGL may not be applied to the enable node GC_EN_NODE, and the first capacitor CO1 may maintain the voltage of the enable node GC_EN_NODE at the previous level (i.e., the first level).

In FIG. 21, in the fifth time period TP5, the fifth switching element S5 may be turned off in response to the voltage of the enable node GC_EN_NODE having the first level, the sixth switching element S6 may be turned off in response to the carry signal CR having the first level, the seventh switching element S7 may be turned off in response to the voltage of the first intermediate node NM1 having the first level, and the eighth switching element S8 may be turned off in response to the carry signal CR having the first level. Therefore, the gate signal GC having the first level may not be output from the gate output node GC_ON.

Figure 22:
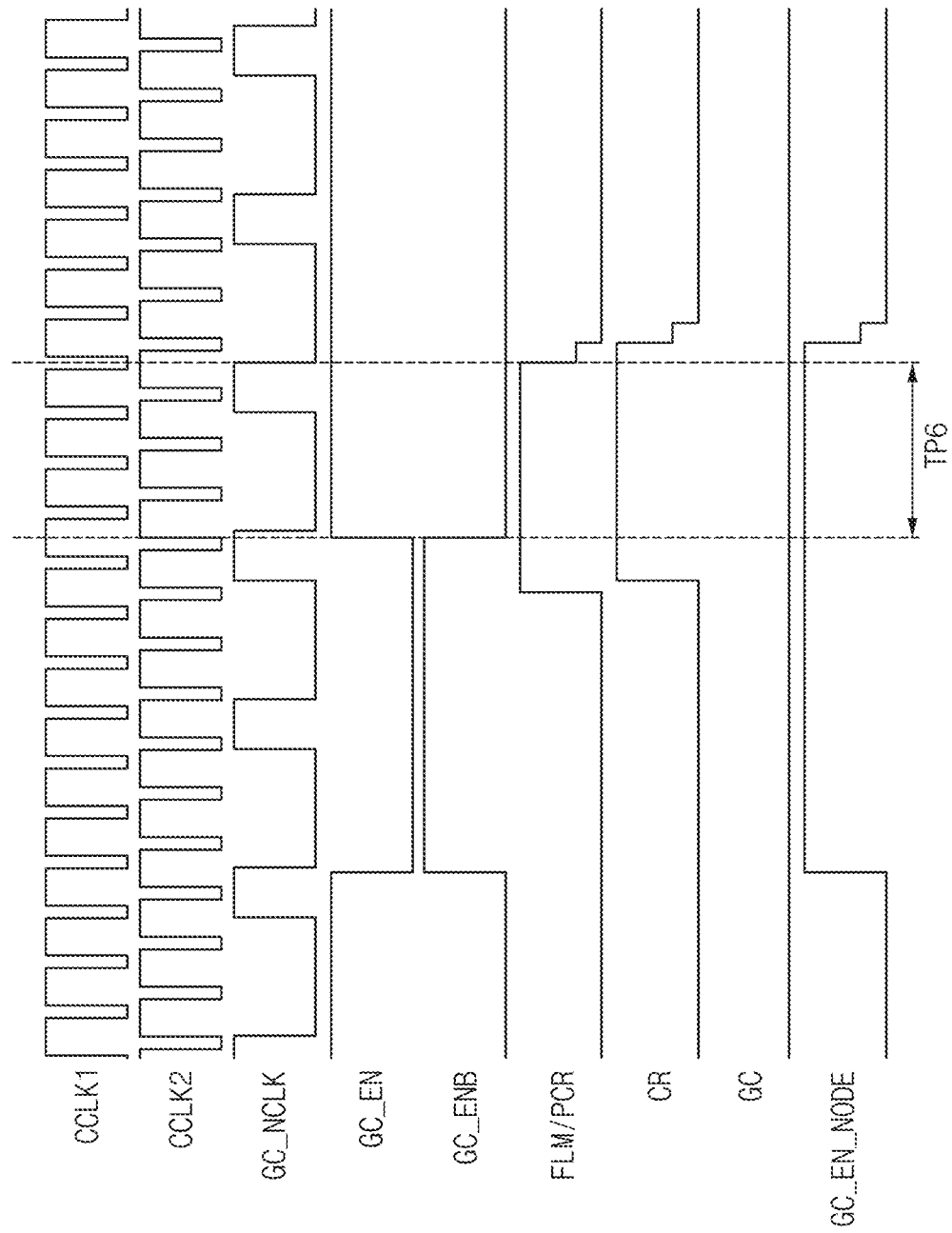
FIG. 22 is a signal timing diagram illustrating an embodiment of an operation of a gate driver of FIG. 4 when an enable signal changes from a second level to a first level while the carry signal is output.
Figure 23:
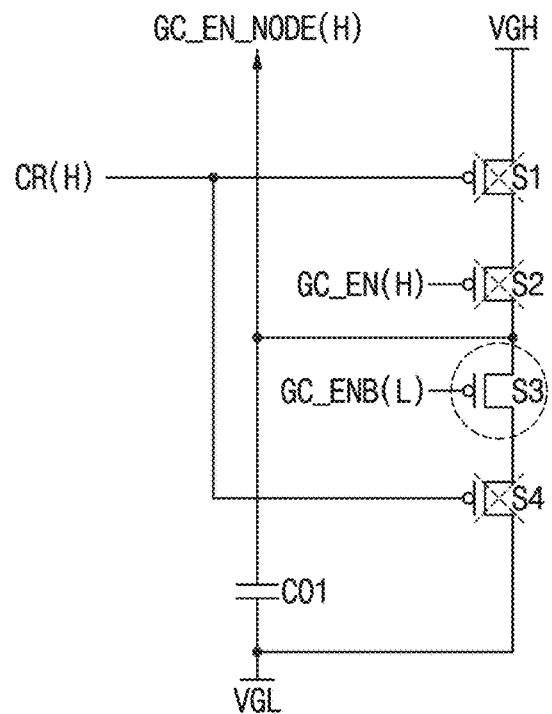
FIG. 23 is a circuit diagram illustrating an operation of an enable node control circuit of FIG. 4 in a sixth time period of FIG. 21.
Figure 24:
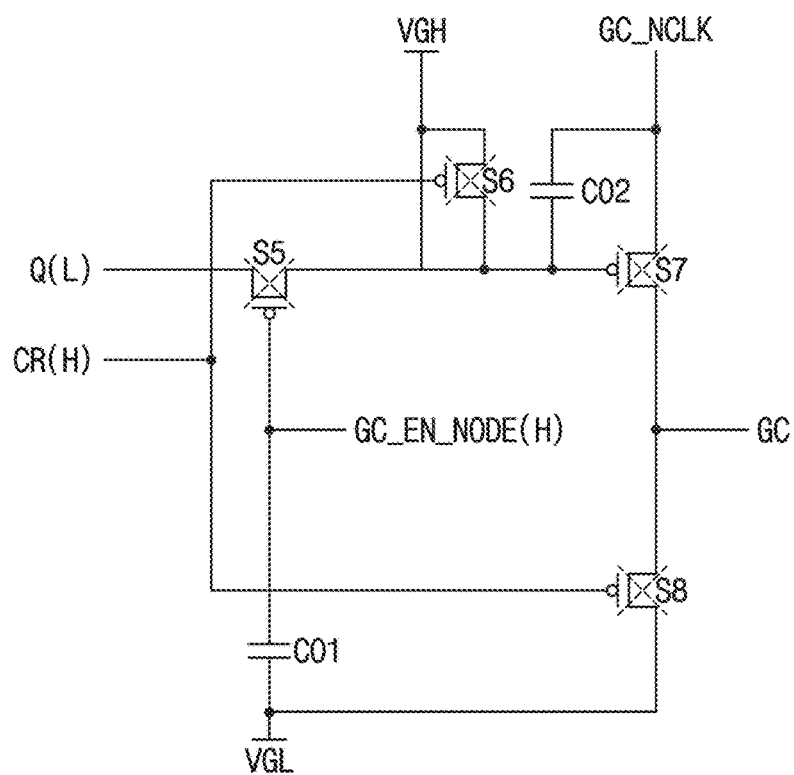
FIG. 24 is a circuit diagram illustrating operations of a masking circuit and a gate output circuit of FIG. 4 in a sixth time period of FIG. 21.

FIG. 22 is a signal timing diagram illustrating an embodiment of an operation of a gate driver of FIG. 4 when an enable signal changes from a second level to a first level while the carry signal is output. FIG. 23 is a circuit diagram illustrating an operation of an enable node control circuit of FIG. 4 in a sixth time period of FIG. 21. FIG. 24 is a circuit diagram illustrating operations of a masking circuit and a gate output circuit of FIG. 4 in a sixth time period of FIG. 21.

Referring to FIGS. 22 to 24, when the enable signal GC_EN changes from the second level to the first level while the carry signal CR having the first level is output, the enable signal GC_EN changes from the second level to the first level. The enable node control circuit 330 may maintain the voltage of the enable node GC_EN_NODE at the first level until the output of the carry signal CR having the first level is completed.

In FIG. 23, in a sixth time period TP6, the third switching element S3 may be turned on in response to the inverted enable signal GC_ENB having the second level, the first switching element S1 may be turned off in response to the carry signal CR having the first level, the fourth switching element S4 may be turned off in response to the carry signal CR having the first level, and the second switching element S2 may be turned off in response to the enable signal GC_EN having the first level. Therefore, the high gate voltage VGH and the low gate voltage VGL may not be applied to the enable node GC_EN_NODE, and the first capacitor CO1 may maintain the voltage of the enable node GC_EN_NODE at the previous level (i.e., the first level).

In FIG. 24, in the sixth time period TP6, the fifth switching element S5 may be turned off in response to the voltage of the enable node GC_EN_NODE having the first level, the sixth switching element S6 may be turned off in response to the carry signal CR having the first level, the seventh switching element S7 may be turned off in response to the voltage of the first intermediate node NM1 having the first level, and the eighth switching element S8 may be turned off in response to the carry signal CR having the first level. Therefore, the gate signal GC having the first level may not be output from the gate output node GC_ON.

As such, the gate driver 300a and the display device 10 including the gate driver 300a may include the control circuit 310 which controls the voltage of the first control node Q and the voltage of the second control node QB in response to the input signal FLM/PCR, the first control clock signal CCLK1, and the second control clock signal CCLK2, the carry output circuit 320 which generates the carry signal CR in response to the voltage of the first control node Q and the voltage of the second control node QB, the enable node control circuit 330 which controls the voltage of the enable node GC_EN_NODE in response to the carry signal CR, the enable signal GC_EN, and the inverted enable signal GC_ENB, the masking circuit 340 which controls the voltage of the first intermediate node NM1 in response to the voltage of the first control node Q, the carry signal CR, and the voltage of the enable node GC_EN_NODE, and the gate output circuit 350 which outputs the gate signal GC in response to the carry signal CR, the voltage of the first intermediate node NM1, and the output clock signal GC_NCLK. Accordingly, when the output clock signal GC_NCLK has at least two active pulses in the active period, the gate signal GC corresponding to the number of output clock signal GC_NCLK may be output.

Figure 25:
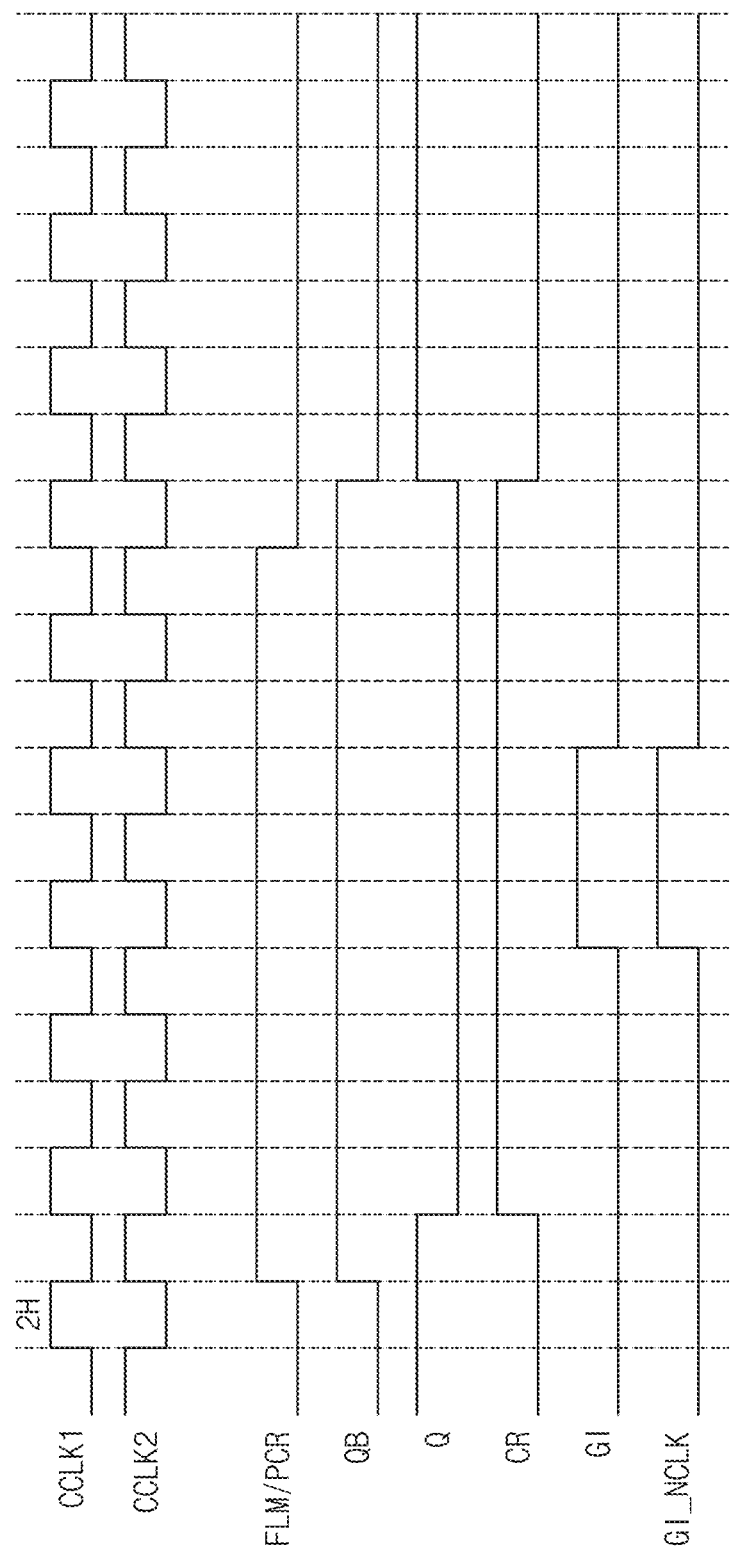
FIG. 25 is a signal timing diagram illustrating an embodiment of an input signal, control clock signals, node signals, and a carry signal of a gate driver of FIG. 4.

FIG. 25 is a signal timing diagram illustrating an embodiment of an input signal, control clock signals, node signals, and a carry signal of a gate driver of FIG. 4.

Referring to FIG. 25, while the carry signal CR has the first level, the output clock signal GC_NCLK may have one active pulse having the first level. In this case, the gate signal GC may have one active pulse having the first level.

Figure 26:
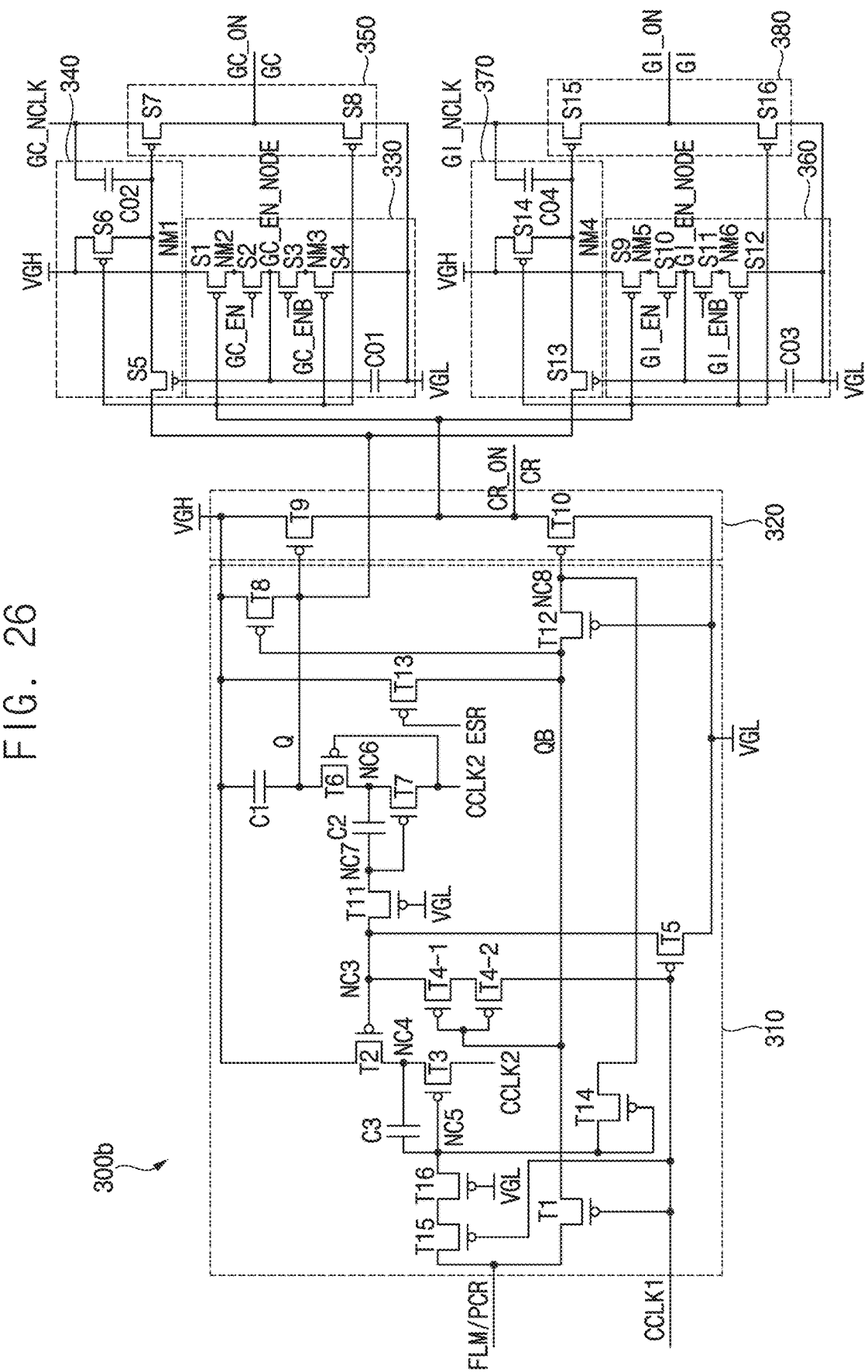
FIG. 26 is a circuit diagram illustrating an embodiment of a gate driver of FIG. 1.

FIG. 26 is a circuit diagram illustrating an embodiment of a gate driver of FIG. 1.

Referring to FIG. 26, an embodiment of a gate driver 300b of FIG. 26 is substantially equal to the embodiment of the gate driver 300a of FIG. 4 except that the gate driver 300b of FIG. 26 further includes a second enable node control circuit 360, a second masking circuit 370, and a second gate output circuit 380. Therefore, any repetitive detailed descriptions of the same or like element as those described above will be omitted.

In an embodiment, the second enable node control circuit 360 may control a voltage of a second enable node GI_EN_NODE in response to the carry signal CR, a second enable signal GI_EN, and a second inverted enable signal GI_ENB.

The second masking circuit 370 may control a voltage of a fourth intermediate node NM4 in response to the voltage of the first control node Q, the carry signal CR, and the voltage of the second enable node GI_EN_NODE.

The second gate output circuit 380 may output a second gate signal GI in response to the carry signal CR, the voltage of the fourth intermediate node NM4, and the second output clock signal GI_NCLK.

The second enable node control circuit 360 may include eighth to eleventh switching elements S8 to S11.

The eighth switching element S8 includes a gate electrode that receives the carry signal CR, a first electrode that receives the high gate voltage VGH, and a second electrode connected to a fifth intermediate node NM5.

The ninth switching element S9 may include a gate electrode that receives the second enable signal GI EN, a first electrode connected to the fifth intermediate node NM5, and a second electrode connected to the second enable node GI_EN_NODE.

The tenth switching element S10 may include a gate electrode that receives the second inverted enable signal GI_ENB, a first electrode connected to the sixth intermediate node NM6, and a second electrode connected to the second enable node GI_EN_NODE.

The eleventh switching element S11 may include a gate electrode that receives the carry signal CR, a first electrode that receives the low gate voltage VGL, and a second electrode connected to the sixth intermediate node NM6.

The second enable node control circuit 360 may further include a third capacitor CO3.

The third capacitor CO3 may include a first electrode connected to the second enable node GI_EN_NODE and a second electrode that receives the low gate voltage VGL.

The second masking circuit 370 may include a twelfth switching element S12 and a thirteenth switching element S13.

The twelfth switching element S12 may include a gate electrode connected to the second enable node GO_EN_NODE, a first electrode connected to the first control node Q, and a second electrode connected to the fourth intermediate node NM4.

The thirteenth switching element S13 may include a gate electrode that receives the carry signal CR, a first electrode that receives the high gate voltage VGH, and a second electrode connected to the fourth intermediate node NM4.

The second masking circuit 370 may further include a fourth capacitor CO4.

The fourth capacitor CO4 may include a first electrode that receives the second output clock signal GI_NCLK and a second electrode connected to the fourth intermediate node NM4.

The second gate output circuit 380 may include a fourteenth switching element S14 and a fifteenth switching element S15.

The fourteenth switching element S14 may include a gate electrode connected to the fourth intermediate node NM4, a first electrode that receives the second output clock signal GI_NCLK, and a second electrode connected to a second gate output node GI_ON.

The fifteenth switching element S15 may include a gate electrode that receives the carry signal CR, a first electrode that receives the low gate voltage VGL, and a second electrode connected to the second gate output node GI_ON.

In an embodiment, in a period during which the carry signal CR has the first level, the output clock signal GC_N-

CLK has at least two active pulses having the first level and the second output clock signal GI_NCLK may have one active pulse having the first level. That is, in the active period, the gate signal GC may have at least two active pulses, and the second gate signal GI may have one active pulse. Accordingly, the display panel 100 may be driven more effectively at the variable frequency.

Figure 27:
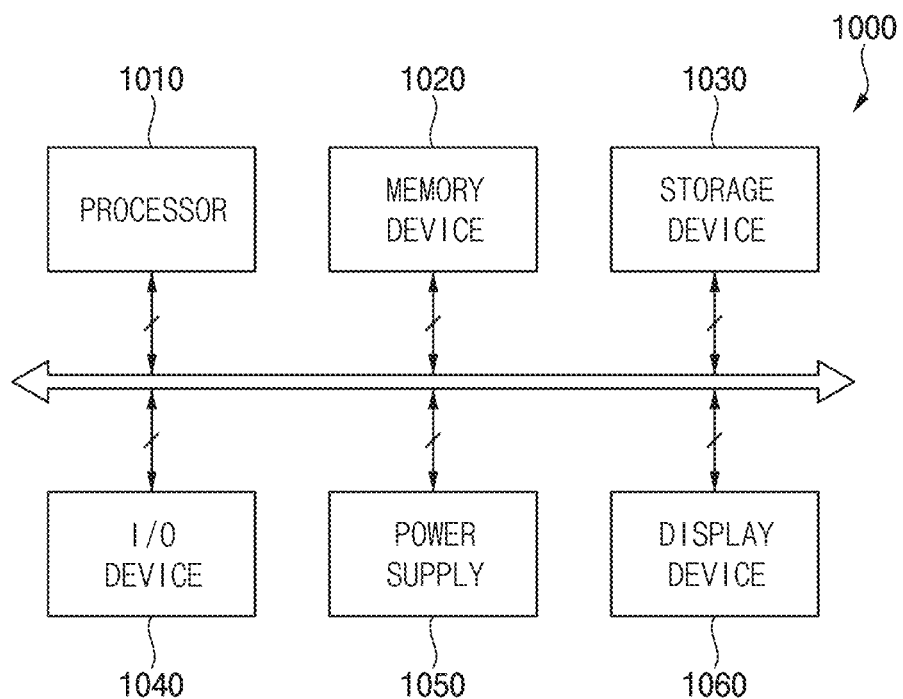
FIG. 27 is a block diagram illustrating an electronic device.
Figure 28:
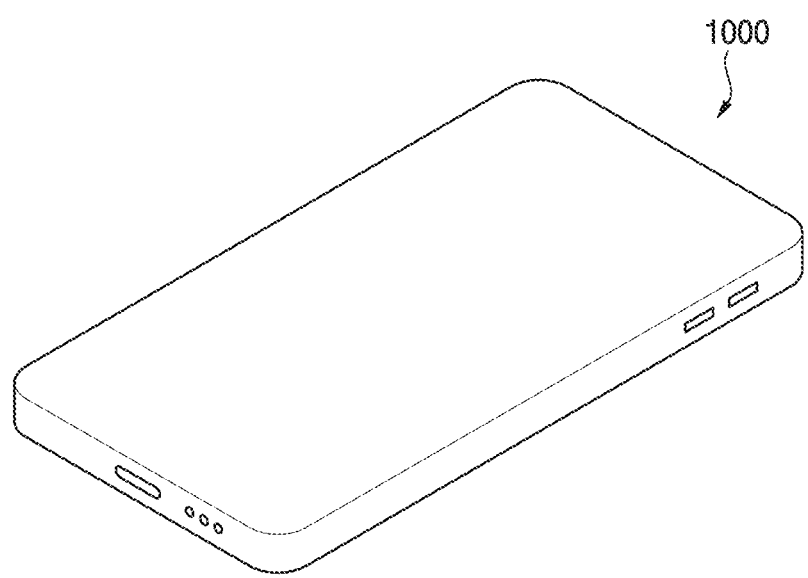
FIG. 28 is a diagram illustrating an embodiment in which the electronic device of FIG. 27 is implemented as a smart phone device.

FIG. 27 is a block diagram illustrating an electronic device. FIG. 28 is a diagram illustrating an embodiment in which the electronic device of FIG. 27 is implemented as a smart phone device.

Referring to FIGS. 27 and 28, an embodiment of the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, or the like.

In an embodiment, as illustrated in FIG. 28, the electronic device 1000 may be implemented as a smart phone. However, the electronic device 1000 is not limited thereto. For example, the electronic device 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. For example, the inventions may be applied to a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A gate driver comprising:
   a control circuit which controls a voltage of a first control node and a voltage of a second control node in response to an input signal, a first control clock signal, and a second control clock signal;
   a carry output circuit which generates a carry signal in response to the voltage of the first control node and the voltage of the second control node;
   an enable node control circuit which controls a voltage of an enable node in response to the carry signal, an enable signal, and an inverted enable signal;
   a masking circuit which controls a voltage of a first intermediate node in response to the voltage of the first control node, the carry signal, and the voltage of the enable node; and
   a gate output circuit which outputs a gate signal in response to the carry signal, the voltage of the first intermediate node, and an output clock signal;
   wherein depending on the enable signal and the inverted enable signal, the gate driver outputs a gate pulse at a higher frequency for a region of a display panel which operates with a higher frequency driving, and a gate pulse at a lower frequency for a region of the display panel which operates with a lower frequency driving.

2. The gate driver of claim 1,
   wherein, when the voltage of the first control node has a first level, the carry signal has a second level, and
   wherein, when the voltage of the first control node has the second level, the carry signal has the first level.

3. The gate driver of claim 1, wherein, in a period during which the carry signal has a first level, the output clock signal has at least two active pulses having the first level.

4. The gate driver of claim 1, wherein, in a period during which the carry signal has a first level, the output clock signal has one active pulse having the first level.

5. The gate driver of claim 1, wherein,
   wherein, when the enable signal has a first level before the carry signal having the first level is output, the enable node control circuit controls a voltage of the enable node to a second level,
   wherein, while the carry signal having the first level is output, the masking circuit controls the voltage of the first intermediate node to the second level in response to the voltage of the enable node having the second level, and
   wherein, while the carry signal having the first level is output, the gate output circuit outputs the gate signal having the first level in response to the voltage of the first intermediate node having the second level.

6. The gate driver of claim 5, wherein, when the enable signal changes from the first level to the second level while the carry signal having the first level is output, the enable node control circuit maintains the voltage of the enable node at the second level until an output of the carry signal having the first level is completed.

7. The gate driver of claim 1,
wherein, when the enable signal has a second level before the carry signal having a first level is output, the enable node control circuit controls a voltage of the enable node to the first level,
wherein, while the carry signal having the first level is output, the masking circuit controls a voltage of the first intermediate node to the first level in response to the voltage of the enable node having the first level, and
wherein, while the carry signal having the first level is output, the gate output circuit does not output the gate signal having the first level in response to a voltage of the first intermediate node having the first level.

8. The gate driver of claim 7, wherein, when the enable signal changes from the second level to the first level while the carry signal having the first level is output, the enable node control circuit maintains a voltage of the enable node at the first level until an output of the carry signal having the first level is completed.

9. The gate driver of claim 1, wherein, while the carry signal having a first level is output, the enable node control circuit maintains a voltage of the enable node at a previous level.

10. The gate driver of claim 1,
wherein, the enable node control circuit controls a voltage of the enable node to the second level when the carry signal having a first level is not output, the enable signal has the first level, and the inverted enable signal has a second level, the voltage of the enable node has the second level, and
wherein the enable node control circuit controls the voltage of the enable node to the first level when the carry signal having the first level is not output, the enable signal has the second level, and the inverted enable signal has the first level.

11. The gate driver of claim 1, wherein the enable node control circuit includes:
a first switching element including a gate electrode which receives the carry signal, a first electrode which receives a high gate voltage, and a second electrode connected to a second intermediate node;
a second switching element including a gate electrode which receives the enable signal, a first electrode connected to the second intermediate node, and a second electrode connected to the enable node;
a third switching element including a gate electrode which receives the inverted enable signal, a first electrode connected to a third intermediate node, and a second electrode connected to the enable node; and
a fourth switching element including a gate electrode which receives the carry signal, a first electrode which receives a low gate voltage, and a second electrode connected to the third intermediate node.

12. The gate driver of claim 11, wherein the enable node control circuit further includes:
a first capacitor including a first electrode connected to the enable node and a second electrode which receives the low gate voltage.

13. The gate driver of claim 12, wherein the masking circuit includes:

a fifth switching element including a gate electrode connected to the enable node, a first electrode connected to the first control node, and a second electrode connected to a first intermediate node; and
a sixth switching element including a gate electrode which receives the carry signal, a first electrode which receives the high gate voltage, and a second electrode connected to the first intermediate node.

14. The gate driver of claim 13, wherein the masking circuit further includes:
a second capacitor including a first electrode which receives the output clock signal and a second electrode connected to the first intermediate node.

15. The gate driver of claim 14, wherein the gate output circuit includes:
a seventh switching element including a gate electrode connected to the first intermediate node, a first electrode which receives the output clock signal, and a second electrode connected to a gate output node; and
an eighth switching element including a gate electrode which receives the carry signal, a first electrode which receives a low gate voltage, and a second electrode connected to the gate output node.

16. The gate driver of claim 1, further comprising:
a second enable node control circuit which controls a voltage of a second enable node in response to the carry signal, a second enable signal, and a second inverted enable signal;
a second masking circuit which controls a voltage of a fourth intermediate node in response to the voltage of the first control node, the carry signal, and the voltage of the second enable node; and
a second gate output circuit which outputs a second gate signal in response to the carry signal, the voltage of the fourth intermediate node, and a second output clock signal.

17. The gate driver of claim 16, wherein, when the carry signal has a first level, the output clock signal has at least two active pulses having the first level, and the second output clock signal has one active pulse having the first level.

18. A display device comprising:
a display panel including pixels; and
a gate driver which outputs a gate signal to the display panel, wherein the gate driver includes:
a control circuit which controls a voltage of a first control node and a voltage of a second control node in response to an input signal, a first control clock signal, and a second control clock signal;
a carry output circuit which generates a carry signal in response to the voltage of the first control node and the voltage of the second control node; an enable node control circuit which controls a voltage of an enable node in response to the carry signal, an enable signal, and an inverted enable signal;
a masking circuit which controls a voltage of a first intermediate node in response to the voltage of the first control node, the carry signal, and the voltage of the enable node; and
a gate output circuit which outputs the gate signal in response to the carry signal, the voltage of the first intermediate node, and an output clock signal;
wherein depending on the enable signal and the inverted enable signal, the gate driver outputs a gate pulse at a higher frequency for a region of a display panel which operates with a higher frequency driving, and a gate pulse at a lower frequency for a region of the display panel which operates with a lower frequency driving.

19. The display device of claim 18,
wherein, when the voltage of the first control node has a first level, the carry signal has a second level, and
wherein, when the voltage of the first control node has the second level, the carry signal has the first level.

20. The display device of claim 18, wherein, in a period during which the carry signal has a first level, the output clock signal has at least two active pulses having the first level.

* * * * *